United States Patent
Olsson et al.

(10) Patent No.: US 11,696,358 B2
(45) Date of Patent: *Jul. 4, 2023

(54) METHODS AND NODES FOR HANDLING BEARERS

(71) Applicant: Telefonaktiebolaget LM Ericsson (publ), Stockholm (SE)

(72) Inventors: Tony Olsson, Nösund (SE); Patrik Hermansson, Gråbo (SE); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

This patent is subject to a terminal disclaimer.

(21) Appl. No.: 17/377,747

(22) Filed: Jul. 16, 2021

(65) Prior Publication Data
US 2021/0345439 A1 Nov. 4, 2021

Related U.S. Application Data

(63) Continuation of application No. 16/853,285, filed on Apr. 20, 2020, now Pat. No. 11,071,161, which is a
(Continued)

(51) Int. Cl.
*H04W 76/22* (2018.01)
*H04L 47/74* (2022.01)
(Continued)

(52) U.S. Cl.
CPC ............ *H04W 76/22* (2018.02); *H04L 47/74* (2013.01); *H04M 15/66* (2013.01); *H04W 8/08* (2013.01);
(Continued)

(58) Field of Classification Search
CPC .... H04L 47/70–788; H04L 47/80–829; H04M 15/00–93; H04W 76/20–28;
(Continued)

(56) References Cited

U.S. PATENT DOCUMENTS

| 8,768,295 B2 | 7/2014 | Cutler et al. |
| 2009/0040966 A1 | 2/2009 | Klatt et al. |

(Continued)

FOREIGN PATENT DOCUMENTS

| CN | 1985534 | 6/2007 |
| CN | 101517994 | 8/2009 |

(Continued)

OTHER PUBLICATIONS

International Search Report and Written Opinion issued in International Application No. PCT/EP2016/054789, dated Apr. 25, 2016, 15 pages.

(Continued)

*Primary Examiner* — Mohammad S Adhami
*Assistant Examiner* — Vladislav Y Agureyev
(74) *Attorney, Agent, or Firm* — Rothwell, Figg, Ernst & Manbeck, P.C.

(57) ABSTRACT

The embodiments herein relate to a method performed by a gateway. The gateway detects that a procedure for activating or deactivating a bearer has been initiated. The gateway receives a first modify bearer or modify access bearers request message for the same PDN connection and UE as the bearer activation or deactivation procedure is intended for. The gateway detects a bearer mismatch between a first set of bearers and a second set of bearers known by the gateway and associated with said same PDN connection and UE. The gateway accepts, during a time interval, the received modify bearer or modify access bearers request message even though the bearer mismatch has been detected.

25 Claims, 21 Drawing Sheets

Related U.S. Application Data continuation of application No. 16/082,807, filed as application No. PCT/EP2016/054789 on Mar. 7, 2016, now Pat. No. 10,652,946.

(51) Int. Cl.
*H04W 76/38* (2018.01)
*H04W 76/32* (2018.01)
*H04M 15/00* (2006.01)
*H04W 8/08* (2009.01)
*H04W 88/16* (2009.01)

(52) U.S. Cl.
CPC ........... *H04W 76/32* (2018.02); *H04W 76/38* (2018.02); *H04W 88/16* (2013.01)

(58) Field of Classification Search
CPC ........... H04W 76/30–38; H04W 88/16; H04W 8/08–087; H04W 8/10–186
See application file for complete search history.

(56) References Cited

U.S. PATENT DOCUMENTS

| | | | |
|---|---|---|---|
| 2010/0081444 | A1 | 4/2010 | Jin et al. |
| 2010/0165857 | A1 | 7/2010 | Meylan et al. |
| 2012/0117257 | A1 | 5/2012 | Huo et al. |
| 2012/0315874 | A1 | 12/2012 | Li et al. |
| 2013/0010622 | A1 | 1/2013 | Horn et al. |
| 2013/0012204 | A1 | 1/2013 | Kim et al. |
| 2013/0182607 | A1 | 7/2013 | Kim et al. |
| 2014/0078898 | A1 | 3/2014 | Anchan et al. |
| 2014/0080484 | A1 | 3/2014 | Centonza et al. |
| 2014/0086052 | A1 | 3/2014 | Cai et al. |
| 2014/0105145 | A1 | 4/2014 | Gao et al. |
| 2014/0241264 | A1 | 8/2014 | Liu |
| 2015/0215822 | A1 | 7/2015 | Won et al. |
| 2015/0230107 | A1 | 8/2015 | Chiba et al. |
| 2016/0080978 | A1* | 3/2016 | Mo ............... H04W 36/24 370/331 |
| 2016/0080992 | A1 | 3/2016 | Huang-Fu et al. |
| 2016/0212760 | A1 | 7/2016 | Iwai |
| 2016/0219605 | A1* | 7/2016 | Karlsson ............... H04W 76/12 |
| 2016/0338144 | A1* | 11/2016 | Jangid ................... H04W 76/32 |
| 2017/0374610 | A1* | 12/2017 | Kim ....................... H04W 48/18 |
| 2018/0007614 | A1 | 1/2018 | Velev et al. |
| 2018/0063724 | A1 | 3/2018 | Zhang et al. |
| 2019/0274174 | A1 | 9/2019 | Watfa et al. |

FOREIGN PATENT DOCUMENTS

| | | | |
|---|---|---|---|
| CN | 104685919 | 6/2015 | |
| EP | 1 763 971 | 12/2009 | |
| EP | 2 622 904 | 8/2013 | |
| EP | 2843885 A1 * | 3/2015 | ............ H04L 12/56 |
| EP | 3 395 024 B1 | 5/2019 | |
| WO | 2012/050841 | 4/2012 | |

OTHER PUBLICATIONS

International Preliminary Report on Patentability issued in International Application No. PCT/EP2016/054789, dated Feb. 21, 2018, 16 pages.

3GPP TS 29.274 V13.4.0 (Dec. 2015), 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13), Dec. 2015, 341 pages.

* cited by examiner

| | SGW receives: | SGW expects: | SGW Concludes: |
|---|---|---|---|
| Case 1. | 1. Modify Bearer Request, EBI = {5} | EBI = {5} | Bearers match perfectly |
| | 2. Create Bearer Response, EBI = {6} | - | MME has created bearer: EBI = {6} |
| Case 2. | 1. Create Bearer Response, EBI = {6} | - | MME has created bearer: EBI = {6} |
| | 2. Modify Bearer Request, EBI = {5,6} | EBI = {5,6} | Bearers match perfectly |
| Case 3. | 1. Modify Bearer Request, EBI = {5,6} | EBI = {5} | Bearer mismatch, EBI={6} is unknown |
| | 2. Create Bearer Response, EBI = {6} | - | MME has created bearer: EBI = {6} |
| Case 4. | 1. Create Bearer Response, EBI = {6} | - | MME has created bearer: EBI = {6} |
| | 2. Modify Bearer Request, EBI = {5} | EBI = {5,6} | Bearer mismatch, EBI={6} is missing |

Fig. 13

| | SGW receives: | SGW expects: | SGW Concludes: |
|---|---|---|---|
| Case 5. | 1. Modify Bearer Request, EBI = {5,6} | EBI = {5,6} | Bearers match perfectly |
| | 2. Delete Bearer Response, EBI = {6} | - | MME has deleted bearer: EBI = {6} |
| Case 6. | 1. Delete Bearer Response, EBI = {6} | - | MME has deleted bearer: EBI = {6} |
| | 2. Modify Bearer Request, EBI = {5} | EBI = {5} | Bearers match perfectly |
| Case 7. | 1. Modify Bearer Request, EBI = {5} | EBI = {5,6} | Bearer mismatch, EBI={6} is missing |
| | 2. Delete Bearer Response, EBI = {6} | - | MME has deleted bearer: EBI = {6} |
| Case 8. | 1. Delete Bearer Response, EBI = {6} | - | MME has deleted bearer: EBI = {6} |
| | 2. Modify Bearer Request, EBI = {5,6} | EBI = {5,6} | Bearer mismatch, EBI={6} is unknown |

Fig. 14

METHODS AND NODES FOR HANDLING BEARERS

CROSS-REFERENCE TO RELATED CASES

This application is a continuation of U.S. application Ser. No. 16/853,285, filed on Apr. 20, 2020, which is a continuation of U.S. application Ser. No. 16/082,807, having a section 371(c) date of Sep. 6, 2018 (now U.S. Pat. No. 10,652,946, issued on May 12, 2020), which is the U.S. National Stage of International Patent Application No. PCT/EP2016/054789, filed Mar. 7, 2016. The above identified applications are incorporated by this reference.

TECHNICAL FIELD

Embodiments herein relate generally to a gateway, a method performed by the gateway, a mobility node and a method performed by the mobility node. More particularly the embodiments herein relate to handling bearers in a communications system.

BACKGROUND

A Packet Data Network (PDN) Connection is defined in the Third Generation Partnership Project Technical Specification (3GPP TS) 23.401 version 13.5.0, chapter 3 as an "association between a UE represented by one IPv4 address and/or one IPv6 prefix and a PDN represented by an APN". UE is short for User Equipment, IPv4 is short for Internet Protocol version 4, IPv6 is short for Internet Protocol version 6 and APN is short for Access Point Name. The PDN consists of one default Evolved Packet System (EPS) Bearer and zero or more dedicated EPS Bearers. One piece of UE can have a number of PDN Connections, and each PDN connection can have one or more EPS Bearers. Many GPRS Tunneling Protocol (GTP) control signaling messages therefore contain lists of one or more EPS bearers, where each EPS bearer is identified by an EPS bearer Identity (Id). GPRS is short for General Packet Radio Services. Thus, the EPS bearer is between the UE and the PDN, and is used to transport IP (v4 and/or v6) packets to and from the UE and PDN.

Some of these GTP control signaling messages contain a list of all EPS bearers for the same UE or PDN connection (depending on the granularity of the message), while other messages contain a list of a subset of all EPS bearers for the same UE or PDN connection. Of these messages, the Modify Bearer Request and the Modify Access Bearers Request messages are of special interest.

The Modify Bearer Request message is used in a number of procedures over GTP based interfaces, most notably mobility procedures (Tracking Area Update/Routing Area Update/Handover (TAU/RAU/Handover), and Service Request procedures. In these procedures the Mobility Management Entity/S4-Serving GPRS Support Node (MME/S4-SGSN) sends one or more Modify Bearer Request messages (one message per PDN connection) over the S11/S4 interface to the Serving Gateway (SGW), and in some cases the SGW forwards the Modify Bearer Request messages over the S5/S8 interface to the Packet data network Gateway(s) (PDN GW, PGW(s)).

In cases when the UE has more than one PDN Connection and the procedure does not require signaling over the S5/S8 interface, the MME may, instead of sending one Modify Bearer Request message per PDN Connection for the same piece of UE, send one single Modify Access Bearers Request message with basically the same information as in the Modify Bearer Request messages the MME would have to send otherwise. The Modify Access Bearers Request message is only used on the S11 interface between the MME and the SGW.

The procedures that involve the Modify Bearer Request and Modify Access Bearers Request are described in 3GPP TS 23.401, with protocol details in 3GPP TS 29.274.

The Modify Bearer Request message and the Modify Access Bearers Request message should contain a list of all EPS bearers for the same UE or PDN connection (depending on the granularity of the message).

Modify Bearer Request message "shall contain all the bearers belonging to the given PDN connection" (3GPP TS 29.274, version 13.4.0, chapter 7.2.7).

The Modify Access Bearers Request message "shall contain all the bearers of all the existing PDN connections of the UE" (3GPP TS 29.274, version 13.4.0, chapter 7.2.24).

To maintain information consistency between nodes, a receiver of a GTP control signaling message with a list of bearers needs to check that all the bearers in the received message are recognized by the receiving node. There should be no unknown bearers in the message. For messages that contain a list of a subset of all EPS bearers for the same UE or PDN connection (depending on the granularity of the message), checking that there are no unknown bearers in the message is enough.

For messages that contain a list of all EPS bearers for the same UE or PDN connection (depending on the granularity of the message), the receiving node needs to check that there are no unknown bearers in the message. The receiving node also needs to check that all the EPS bearers for the same UE or PDN connection that exist in the receiving node are included in the received message. There should be no missing bearers.

This means that for messages that contain a list of all EPS bearers for the same UE or PDN connection (depending on the granularity of the message) there should be a one-to-one correspondence between the bearers in the message and the bearers in the receiving node.

If there is a mismatch between the list of bearers in the received (Modify Bearer Request or Modify Access Bearers Request) message and the bearers that are established in the receiving node, the receiving node needs to act in one way or another, in order to resolve the bearer mismatch.

When there is no bearer mismatch, the message should be accepted by the receiving node (unless there is some other problem with the message). The corresponding response message sent from the receiving node to the sending node includes a Cause information element with the Cause value set to "Request accepted".

When all bearers are unknown by the receiving node, the message should be rejected by the receiving node with the Cause value set to "Context Not Found". Note that the 3GPP standard also gives directives on when the message should be addressed to the peer node's (non-zero) Tunnel endpoint identifier (TEID) or to the generic TEID=0.

When there are one or more known bearers and one or more unknown bearers, the receiving node should "partially accept" the message (unless there is some other problem with the message). In the response, the main Cause value (the Cause information element on message level) should be set to "Request accepted partially", and for each Bearer Context in the response message the corresponding bearer Cause value should be set to either "Request accepted" or "Context Not Found", depending on whether the bearer is recognized by the receiving node or not.

Before describing an example of a bearer mismatch, a known communication system 100 with a non-roaming architecture for Third Generation Partnership Project (3GPP) access will be described with reference to FIG. 1.

FIG. 1 shows a UE 101 which is served by a Radio Access Network (RAN) node (not shown in FIG. 1). The RAN node is comprised in a RAN, and the RAN is represented by Evolved-Universal Terrestrial Radio Access Network (E-UTRAN) 103 in FIG. 1. The RAN node may be for example a base station (in the GSM EDGE Radio Access Network (GERAN) 122), a NodeB (in the Universal Terrestrial Radio Access Network (UTRAN) 125), an evolved NodeB (eNode B, eNB) (in the E-UTRAN 103), Radio Network Controller (RNC) (in the UTRAN 125) or any other element capable to communicate with the UE 101. The reference point between the UE 101 and the E-UTRAN 103 may be referred to as Long Term Evolution-Uu (LTE-Uu). GSM is short for Global System for Mobile Communications and EDGE is short for Enhanced Data Rates for GSM Evolution.

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

A MME 105 may be connected to the E-UTRAN 101 via the reference point S1-MME. The MME 105 is an element having functions such as e.g. Non-Access Stratum (NAS) signalling, Inter Core Network (CN) node signalling for mobility between 3GPP access networks, UE reachability, Tracking Area (TA) list management, PGW and SGW selection, MME selection for handover with MME change etc. S10 is the reference point between MMEs 105 for MME relocation and MME to MME information transfer.

Two gateways are seen in FIG. 1, i.e. the SGW 108 and the PGW 110. The SGW 108 and the PGW 110 may be implemented in one physical node or in separate physical nodes. The SGW 108 is the gateway which terminates the interface towards E-UTRAN 101. The reference point between the SGW 108 and the E-UTRAN 103 for the per bearer user plane tunneling and inter eNodeB path switching during handover may be referred to as S1-U. The SGW 108 routes and forwards user data packets, while also acting as the mobility anchor for the user plane during inter-eNodeB handovers and as the anchor for mobility between LTE and other 3GPP technologies (relaying the traffic between Second Generation/Third Generation (2G/3G) systems and the PGW 110) etc. S11 is the reference point between the SGW 108 and the MME 105.

The PGW 110 is the gateway which terminates the SGi interface towards the PDN. The PDN is illustrated in FIG. 1 by the Operator's IP Services (e.g. IMS, PSS etc.) 115. IMS is short for IP Multimedia Subsystem or IM Multimedia core network Subsystem and PSS is short for Packet Switched Streaming. If the UE 101 is accessing multiple PDNs, there may be more than one PGW 110 for that UE 101. Functions of the PGW 110 are e.g. providing connectivity from the UE 101 to external PDNs by being the point of exit and entry of traffic for the UE 101, performing policy enforcement, packet filtering for each user, charging support, lawful interception and packet screening etc. S5 is the reference point which provides user plane tunnelling and tunnel management between the SGW 108 and the PGW 110.

The SGSN 118 is responsible for the delivery of data packets from and to the UE's 101 within its geographical service area. One of the SGSN's 118 functions is to provide signaling for mobility between 2G/3G and E-UTRAN 103 3GPP access networks. 2G/3G access network are exemplified with GERAN 122 and UTRAN 125 in FIG. 1. Some further functions of the SGSN 118 are to handle packet routing and transfer, mobility management (attach/detach and location management), logical link management, and authentication and charging functions etc. S3 is the interface between the SGSN 118 and the MME 105. S4 is a reference point between the SGSN 118 and the SGW 108. S12 is the reference point between the SGW 108 and the UTRAN 125. In some embodiments, the SGSN 118 and the MME 105 are co-located in one node. In this text, the term MME/SGSN will refer to any one of a standalone MME 105 or a standalone SGSN 108 or a combined MME 105 and SGSN 118 node. The SGSN 118 may also be referred to as a S4-SGSN. In the following, when the term MME is used, it refers to any of the standalone MME, a combined MME/SGSN or a combined MME/S4-SGSN. The term MME is used for the sake of simplicity.

The Home Subscriber Server (HSS) 128 is a subscriber server node similar to the GSM Home Location Register (HLR) and Authentication Centre (AuC). The HSS 128 comprises subscriber-related information (subscriber profiles), performs authentication and authorization of the user, and may provide information about the subscriber's location and IP information. The reference point S6a enables transfer of subscription and authentication data for authenticating/authorizing user access to the evolved system between the MME 105 and the HSS 128.

The Policy and Charging Rules Function (PCRF) 130 is a policy and charging control element. The PCRF 130 encompasses policy control decision and flow based charging control functionalities, it provides network control regarding the service data flow detection, gating, Quality of Service (QoS) and flow based charging etc. The PCRF 130 may be described as a functional entity which may be a standalone node or a function implemented in another node. The reference point Gx provides transfer of (QoS) policy and charging rules from the PCRF 130 to a Policy and Charging Enforcement Function (PCEF) in the PGW 110.

Rx is the reference point which resides between the PCRF 130 and the Operator's IP Services 118. The Rx reference point is used to exchange application level session information between the PCRF 130 and the Application Function (AF) (not shown).

In some embodiments, a communications system may be divided into a RAN and a CN. Thus, the UE 101 reaches the CN using a suitable access technology, for example the E-UTRAN 103 as exemplified in FIG. 1. Note that FIG. 1 uses E-UTRAN 103 as an example, and that the UE 101 may reach the CN using any other suitable access technology, both 3GPP technologies and non-3GPP technologies.

The RAN may be represented by e.g. the E-UTRAN 103 and may comprise a RAN node such as e.g. the base station as described above. Using FIG. 1 as an example, the CN may comprise the MME 108, the SGW 108, the PGW 110, the SGSN 118, the HSS 127 and the PCRF 130. The RAN and the CN may each comprises additional entities not shown in FIG. 1. The CN may be a Packet Switched (PS) core network or a Circuit Switched (CS) core network. In other embodiments, the communications system 110 is not divided into a RAN and a CN. Instead, the communications system 100 may comprise a virtualized CN, and the control and user planes are split. Terms such as Software Defined Network (SDN), Network Functions Virtualization (NFV) and Network Virtualization (NV) may be used in a scenario when with the virtualized CN where the control and user planes are split. The user plane (sometimes known as the data plane, forwarding plane, carrier plane or bearer plane) carries the network user traffic and that the control plane carries signalling traffic. As the SDN decouples the user and control planes, it removes the control plane from network hardware and implements it in software instead, which enables programmatic access and, as a result, makes network administration much more flexible. The control plane signalling may be routed to the virtualized CN and the user plane signalling is bypassed the virtualized CN. A virtualized CN may comprise virtual network services enabled by a virtualized MMME (vMME), virtualized SGSN (vSGSN), virtualized PGW (vPGW), virtualized SGW (vSGW), virtualized Gateway GPRS Support Node (vGGSN), virtualized PCRF (vPCRF), virtualized Deep Packet Inspection (vDPI), vProbe, virtualized Evolved Packet Data Gateway (vePDG) and virtualized Trusted Wireless Local Area Network Access Gateway (vTWAG) etc.

It should be noted that the communication links in the communications systems seen in FIG. 1 may be of any suitable kind including either a wired or wireless link. The link may use any suitable protocol depending on type and level of layer (e.g. as indicated by the Open Systems Interconnection (OSI) model) as understood by the person skilled in the art.

Now returning to an example of a bearer mismatch, as mentioned before FIG. 1 was described. FIG. 2 is an example of such bearer mismatch as a result of a connectivity problem or a temporary overload. At the start of the method, the MME 105, the SGW 108 and the PGW 110 all have information about that the EPS bearers with EPS Bearer Identities (EBI) 5, 6 are created. This is indicated with EBI={5,6} in FIG. 2. The method in FIG. 2 comprises at least some of the following steps, which steps may be performed in any suitable order than described below:

Step 200

The PGW 110 may send a Credit Control Request (CCR) message to the PCRF 130. The sending of the CCR may be a result of a procedure initiated from the MME 105, e.g. a mobility procedure. The PCRF 130 may receive the CCR message from the PGW 110.

Step 201

The PGW 110 receives Policy and Charging Control (PCC) rules from the PCRF 130, indicating that one or more dedicated bearers should be deactivated. The PCC rules are comprised in a Re-Authorization-Request (RAR) message or a Credit Control Answer (CCA) message sent by the PCRF 130 to the PGW 110. The PCC rules are comprised in the RAR in the scenario where the PGW 110 sends the RAA message in step 202, i.e. a scenario where step 200 is not performed. The PCC rules are comprised in the CCA message in a scenario where the PGW 110 has sent a CCR message in step 200. The PGW 110 receives the RAR or CCA message from the PCRF 130.

The CCA is a response to the CCR in step 200.

A PCC rule has several purposes, for example to detect that a packet belongs to a service data flow, to identify the service data flow, to provide applicable charging parameters for a service data flow, to provide policy control for a service data flow etc.

Step 202

When the PGW 110 has received and executed the PCC rules received from the PCRF 130, the PGW 110 may send a Re-Auth Answer (RAA) message to the PCRF 130. The RAA message is a response to the RAR message in step 201.

The following

Table provides an overview of the two scenarios in steps 200-203, where the left column represents the scenario which is initiated by the PCRF 130 and the right column represents the scenario which is initiated by the PGW 110:

TABLE 1

| Scenario 1: Initiated by PCRF 130 | Scenario 2: Initiated by PGW 110 |
|---|---|
| Step 201: PCRF 130 sends RAR to PGW 110 | Step 200: PGW 110 sends CCR to PCRF 130 |
| Step 202: PGW 110 replies with RAA to PCRF 130 | Step 201: PCRF 130 replies with CCA to PGW 110 |

The above alternative scenarios 1 and 2 are also illustrated in FIG. 1. Thus, the RAR and RAA is an alternative to the CCR and CCA.

The receipt of the PCC rules may trigger a create bearer request, a delete bearer request or an update bearer request procedure.

Step 203

In this example it is assumed that the PGW 110 sends a Delete Bearer Request message to the SGW 108 to delete a dedicated bearer. The dedicated bearer to be deleted is the one with EBI={6}, The SGW 108 receives the Delete Bearer Request message from the PGW 110, and the SGW 108 forwards the Delete Bearer Request message to the MME 105.

FIG. 2 illustrates an example where one dedicated bearer is to be deleted. However, in other examples, the Delete Bearer Request message may comprise a list of a plurality of dedicated bearers to be deleted.

Due to temporary connectivity problems between the SGW 108 and the MME 105 or due to a temporary overload in the MME 105, the message does not reach the MME 105. The SGW 108 does not get any response from MME 105 to the Delete Bearer Request message (indicated with an "x" in FIG. 2), e.g. due to temporary connectivity problems between the SGW 108 and the MME 105. After a number seconds (the number of seconds may be referred to as a T3-RESPONSE seconds), the SGW 108 makes a new attempt to send the same message to the MME 105. The T3-REPONSE seconds may be described as the time that the SGW 108 waits before resending the message and T3 may be described as a retry timer which is started when the Delete Bearer Request message has been sent. The number of attempts of resending of the message depends on the parameter N3-REQUESTS. The N3-REQUEST is a retry counter. 3GPP TS 29.274, V13.4.0 (2015-12), chapter 7.6 defines the T3-RESPONSE and N3-REQUEST as follows: "A timer, denoted T3-RESPONSE, shall be started when a signaling message (for which a reply is expected) is sent. A signaling message or the triggered message has probably been lost if a reply has not been received before the T3-RESPONSE timer expires. Once the T3-RESPONSE timer expires, the message corresponding to the T3-RE- SPONSE timer is then retransmitted if the total number of retry attempts is less than N3 REQUESTS times. [ . . . ]"

Step 204

The SGW 108 gives up in waiting for a response, and sends a Delete Bearer Response message to the PGW 110, with a Cause set to "Remote peer not responding", where the remote peer is the MME 105. The SGW 108 and the PGW 110 deletes the bearer(s), as requested in step 203. After that the bearer still exists in the MME 105, while it is removed from SGW 108 and PGW 110. So since the PGW 110 does not receive any response, and after having exhausted all retransmission attempts the PGW 110 deletes the bearer anyway.

After the deletion of the bearer with EBI={6}, the SGW 108 and the PGW 110 has information about that the EBI={5} is the one which is created. The MME 105 still has information about EBI={5,6}.

Step 205

Later, when the connectivity is restored, or when the MME 105 has recovered from a temporary overload situation, the MME 105 sends a Modify Bearer Request message or a Modify Access Bearers Request message to the SGW 108 for the EBI={5,6}. The SGW 108 receives the Modify Bearer Request message from the MME 105. The SGW 108 detects a "Bearer mismatch", i.e. the bearer 6 in the EBI={5, 6} which is associated with the Modify Bearer Request message has been deleted as a result of step 204.

Problems with Existing Solutions

Problem #1: Missing Bearers

As described above, the standard provides a mechanism for handling unknown bearers in a GTP message. The mechanism is described above.

The standard does not state explicitly how missing bearers should be handled. Different interpretations are possible. One possibility for the receiving node is to accept the message and to locally delete any bearers that are not included in the received message. Another possibility is to reject the entire message, for example with a Cause value set to "Mandatory IE missing" or "Conditional IE missing", and with the Offending Information Element (IE) set to "Bearer Context" to indicate that some bearer context is missing in the request message.

The probable result of rejecting the message is that the MME 105 will delete the PDN Connection and send a Delete Session Request message. Experience from live networks has shown that deleting PDN Connections in cases like this can have unwanted negative effects on end-user services, especially for time-critical services such as Voice over Long Term Evolution (VoLTE) and IMS emergency calls.

Problem #2: Racing Conditions

The 3GPP standard gives no advice on how to handle procedures that are executed more or less at the same time. The standard seems to have been written from the assumption that procedures are executed in isolation and that there is no need to consider effects of one procedure on another. This is the most severe problem with the existing solution.

The rule mentioned earlier, that for messages that contain a list of all EPS bearers for the same UE 101 or PDN connection (depending on the granularity of the message) there should be a one-to-one correspondence between the bearers in the message and the bearers in the receiving node, works only for the static case when bearers have been established at an earlier stage. The rule does not work while bearers are being created. The rule does not take into consideration that it takes some time to create a bearer across the involved nodes in the network, and that during that time different nodes will have a different number of bearers established.

The Modify Bearer Request message, as well as the Modify Access Bearers Request message contains bearers that exist in the MME 105 at the moment the message is sent from the MME 105. This is exemplified in FIG. 3 and FIG. 4.

FIG. 3 illustrates an example of a Procedure Using Modify Bearer Request. Optional steps are indicated with dotted arrows in FIG. 3. At the start of the method, the MME 105, the SGW 108 and the PGW 110 all have information about that the EPS bearers with EBI={5, 6} are created. This is indicated with EBI={5,6} in FIG. 3. The procedure in FIG. 3 comprises at least some of the following steps, which steps may be performed in any suitable order than described below:

Step 301

The MME 105 sends a Modify Bearer Request message to the SGW 108. The EPS Bearer Id of each bearer within the same PDN connection as known by the MME 105 is included in the message. The Modify Bearer Request message is for the bearer with EBI={5,6}, i.e. the Modify Bearer Request message comprises ID information which indicates the identities of the bearer to be modified, i.e. 5 and 6.

Under certain circumstances (defined in 3GPP TS 23.401), the SGW 108 may forward the Modify Bearer Request message to the PGW 110. The PGW 110 receives the forwarded Modify Bearer Request message from the SGW 108.

Step 302

The PGW 110 may interact with the PCRF 130 and by that the PGW 110 may send a CCR message to the PCRF 130. The PCRF 130 may receive the CCR message from the PGW 110. This is an optional step.

Step 303

The PCRF 130 may send a CCA message to the PGW 110. The PGW 110 may receive the CCA message from the PCRF 130. This is an optional step.

Step 304

The PGW 110 replies by sending a Modify Bearer Response message back to the SGW 108. The SGW 108 receives the Modify Bearer Response message from the SGW 108. SGW 108 replies by sending a Modify Bearer Response to the MME 105. The MME 105 receives the Modify Bearer Response message from the SGW 108.

FIG. 4 illustrates an example of a Procedure Using Modify Access Bearers Request. At the start of the method, the MME 105, the SGW 108 and the PGW 110 all have information about that the EPS bearers with EPS Bearer Identities (EBI) 5, 6 are created. This is indicated with EBI={5,6} in FIG. 4. The procedure in FIG. 4 comprises at least some of the following steps, which steps may be performed in any suitable order than described below:

Step 401

The MME 105 sends a Modify Access Bearers Request message to the SGW 108. The EPS Bearer Id of each bearer within all PDN connections for the same piece of UE 101 as known by the MME 105 is included in the message. The SGW 108 receives the Modify Access Bearers Request message from the MME 105. The Modify Access Bearers Request message comprises the identities of the bearers to be modified, i.e. bearers 5 and 6, EBI={5,6}.

Step 402

The SGW 108 replies with a Modify Access Bearers Response message to the MME 105. The MME 105 receives the Modify Access Bearers Response message from the SGW 108.

The PGW 110 is not involved in the procedure in FIG. 4.

A Default Bearer Activation procedure is exemplified in FIG. 5. The procedure in FIG. 5 comprises at least some of the following steps, which steps may be performed in any suitable order than described below:

Step 501

The UE 101 requests the MME 105 to establish a PDN Connection. The MME 105 sends a Create Session Request message to the SGW 108. The message includes the UE's International Mobile Subscriber Identity (IMSI), the APN to which the UE 101 wishes to be connected, and the EPS Bearer Id for the Default Bearer to be created. As an example, the EBI may be EBI={5}. Note that the MME 105 may choose any EBI in the interval 5 to 15 that is not already used by the UE 101. EBI={0} is used as a place-holder (in a Create Bearer Request message) for a bearer that has not yet been created. EBIs 1 to 4 are reserved.

The SGW 108 receives the Create Session Request message from the MME 105. The SGW 108 forwards the Create Session Request message to the PGW 110. The PGW 110 receives the forwarded Create Session Request message from the SGW 108.

Step 502

PGW 110 signals with PCRF 130 (and a number of other external systems, not shown in FIG. 5). This involves that the PGW 110 sends a CCR message to the PCRF 130, that the PCRF 130 receives the CCR message from the PGW 110, that the PCRF sends a CCA message to the PGW 110 and that the PGW 110 receives the CCA message from the PCRF 130.

Step 503

The PGW 110 then replies to the SGW 108 by sending a Create Session Response message. The message includes an allocated IP address for the UE 101, i.e. a PDN Address Allocation etc. The SGW 108 receives the Create Session Response message from the PGW 110. The SGW 108 forwards the Create Session Response message to the MME 105. The MME 105 receives the Create Session Response message from the SGW 108.

Step 504

The MME 105 sends a Modify Bearer Request message to the SGW 108. The SGW 108 receives the Modify Bearer Request message from the MME 105. The Modify Bearer Request message comprises EBI={5}, eNodeB Fully Qualified-Tunnel Endpoint Identifier (F-TEID), etc.

Step 505

The SGW 108 sends a Modify Bearer Response message to the MME 105. The MME 105 receives the Modify Bearer Response message from the SGW 108.

In a Dedicated Bearer Activation procedure, the new bearer(s) are created in one node at a time. More importantly: the bearers are given EPS Bearer Ids in one node at a time. A new bearer is given an EPS Bearer ID first in the MME 105, then in the SGW 108 and last in the PGW 110.

FIG. 6 illustrates an example of dedicated Bearer Activation. Optional steps are indicated with dotted arrows in FIG. 6. At the start of the method, the MME 105 the SGW 108 and the PGW 110 has information about the bearer with EBI={5}. EBI={5} may have been created as described in FIG. 5. The method in FIG. 6 comprises at least some of the following steps, which steps may be performed in any suitable order than described below:

Step 600

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 601

The PGW 110 receives PCC rules from the PCRF 130, indicating that one or more dedicated bearers should be created. The PCC rules are comprised in a RAR message or a CCA message sent by the PCRF 130 to the PGW 110. The PCC rules are comprised in the RAR in the scenario where the PGW 110 sends the RAA message in step 602, i.e. a scenario where step 600 is not performed. The PCC rules are comprised in the CCA message in a scenario where the PGW 110 has sent a CCR message in step 600. The PGW 110 receives the RAR or CCA message from the PCRF 130. The CCA is a response to the CCR in step 600.

Step 602

When the PGW 110 has received and executed the PCC rules received from the PCRF 130, the PGW 110 may send a RRA message to the PCRF 130. The RAA message is a response to the RAR message in step 601.

Thus, the RAR and RAA is an alternative to the CCR and CCA.

Table described in relation to FIG. 2 provides an overview of the CCR, CCA, RAR and RAA messages, and is equally applicable to FIG. 6.

Step 603

The PGW 110 sends a Create Bearer Request message to the SGW 108. The EPS Bearer Id for each bearer will be decided by the MME 105. Thus, the Create Bearer Request message comprises EBI={0}. The SGW 108 receives the Create Bearer Request message from the PGW 110. The SGW 108 forwards the Create Bearer Request message to the MME 105. The MME 105 receives the Create Bearer Request message from the SGW 108. As described earlier, one or more bearers may be created with the same Create Bearer Request/Response message, but only one bearer is illustrated herein as an example.

Step 604

The MME 105 allocates an EPS Bearer Id for each bearer (e.g. EBI={6}) and replies by sending a Create Bearer Response message with the new EPS Bearer Id(s) back to the SGW 108. The SGW 108 receives the Create Bearer Response message from the MME 105. The SGW 108 forwards the Create Bearer Response message to the PGW 110.

As a result of this, all nodes have information about EBI={5,6}. This means, for example, that if a Modify Bearer Request message or a Modify Access Bearers Request message, which is supposed to contain a list of "all" EPS Bearers, is sent from an MME 105 in which a bearer has just been created and given an EPS Bearer Id, arrives at the receiving node (SGW 108 or PGW 110) before the same bearer has been created and given an EPS Bearer Id there, the receiving node will detect that the message contains an "unknown" bearer. If the receiving node rejects this bearer, the result is that the newly created bearer is deleted before it is completely created in all nodes. There may be a permanent bearer mismatch, and the end-user service will in any case not be delivered as expected.

FIG. 7 illustrates an example of a bearer deactivation procedure. At the start of the method, the MME 105 the SGW 108 and the PGW 110 has information about the two bearers with EBI={5,6}. The method in FIG. 7 comprises at least some of the following steps, which steps may be performed in any suitable order than described below:

Step 700

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 701

The PGW 110 receives PCC rules from the PCRF 130, indicating that one or more dedicated bearers should be deactivated. This may involve that the PCRF 130 sends a RAR or CCA message to the PGW 110, that the PGW 110 receives the RAR or CCA message from the PCRF 130, that the PGW 110 may send a RAA message to the PCRF 130 and that the PCRF 130 may receive the RAA message from the PGW 110.

The PCC rules are comprised in the RAR in the scenario where the PGW 110 sends the RAA message in step 701, i.e. a scenario where step 700 is not performed. The PCC rules are comprised in the CCA message in a scenario where the PGW 110 has sent a CCR message in step 700. The CCA is a response to the CCR in step 700.

Step 702

When the PGW 110 has received and executed the PCC rules received from the PCRF 130, the PGW 110 may send a RRA message to the PCRF 130. The RAA message is a response to the RAR message.

Thus, the RAR and RAA is an alternative to the CCR and CCA.

Table described in relation to FIG. 2 provides an overview of the CCR, CCA, RAR and RAA messages, and is equally applicable to FIG. 7.

Step 703

The PGW 110 sends a Delete Bearer Request message to the SGW 108. The Delete Bearer Request message comprises information which indicates that it is the bearer with EBI={6} that should be deleted. The SGW 108 receives the Delete Bearer Request message from the PGW 110. The SGW 108 forwards the Delete Bearer Request message to the MME 105. The MME 105 receives the forwarded Delete Bearer Request message from the SGW 108. Deletion of a bearer may also be referred to as a deactivation of a bearer.

Step 704

The MME 105 deactivates the bearer(s) towards the eNodeB and replies by sending a Delete Bearer Response message back to the SGW 108. The SGW 108 receives the Delete Bearer Response message from the MME 105. The SGW 108 forwards the Delete Bearer Response message to the PGW 110. The PGW 110 receives the Delete Bearer Response message from the SGW 108.

The bearers are deleted in one node at a time (and not all nodes at the same time). It is when a node receives the Delete Bearer Response message that it should actually delete the bearer(s). It is because the bearers are deleted in one node at a time there can be bearer mismatches in signal racing conditions. In this sense the bearer deactivation procedures "mirrors" the bearer activation procedure.

After step 704, the nodes MME 105, the SGW 108 and the PGW 110 all have information about that it is only the bearer with EBI={5} that is activated, i.e. EBI={6} is deleted/deactivated.

In a racing condition, there is a risk that two peer nodes do not have exactly the same bearers at the same time.

A Permanent Bearer Mismatch can be caused by, for example: In the scenario described above with reference to FIG. 2; An internal error forces a node to delete a bearer.

A Temporary Bearer Mismatch can occur as a result of a signaling racing condition, for example: the PGW 110 sends a Create Bearer Request message, and the MME 105 sends a Modify Bearer Request or Modify Access Bearers Request message. When the MME 105 also responds to the Create Bearer Request, there is a risk for a racing condition between the Create Bearer Response message and the Modify Bearer Request message, either on the S11/S4 interface between the MME 105 and the SGW 108, or on the S5/S8 interface between the SGW 108 and the PGW 110.

This scenario has the following variations: 1) Modify Bearer Request arrives either before or after Create Bearer Response; 2) Modify Bearer Request either includes or does not include the newly created dedicated bearer(s).

These variations combined result in four different cases which may occur in the PGW 110 or the SGW 108

Case 1: Modify Bearer Request arrives before Create Bearer Response. Modify Bearer Request does not include the newly created dedicated bearer(s). From the receiving node's point of view there is no problem.

FIG. 8 illustrates an example of the Racing Condition: Create Bearer Response and Modify Bearer Request for case 1. There is a racing condition over two interfaces so that both SGW 108 and the PGW 110 must handle racing and bearer mismatch. The Create Bearer Response is also illustrated in FIG. 13 which will be described below.

A precondition for the method in FIG. 8 is that the Modify Bearer Request or Modify Access Bearers Request is sent from the MME 105 while a Bearer Activation procedure is triggered from the PGW 110.

Normal case A: Modify Bearer Request arrives before Create Bearer Response; Modify Bearer Request does not include the newly created dedicated bearer(s).

At the receiving node (SGW 108, MME 105)—No problem.

Note that the situation may occur for the signaling over the S11/S4 interface between the MME/S4-SGSN 105 and the SGW 108, and also in the PGW 110 for signaling over S5/S8, S2a and over S2b.

At the start of the method in FIG. 8, the MME 105, the SGW 108 and the PGW 110 has information about that bearer with EBI={5} is activated. The method in FIG. 8 comprises at least some of the following steps, which steps may be performed in any suitable order than described below:

Step 800

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 801

The PGW 110 receives PCC rules from the PCRF 130, indicating that one or more dedicated bearers should be created. The PCC rules are comprised in a RAR message or a CCA message sent by the PCRF 130 to the PGW 110. The PCC rules are comprised in the RAR in the scenario where the PGW 110 sends the RAA message in step 802, i.e. a scenario where step 800 is not performed. The PCC rules are comprised in the CCA message in a scenario where the PGW 110 has sent a CCR message in step 800. The PGW 110 receives the RAR or CCA message from the PCRF 130.

The PGW 110 receives the RAR or CCA message from the PCRF 130. The CCA is a response to the CCR in step 600.

Step 802

When the PGW 110 has received and executed the PCC rules received from the PCRF 130, the PGW 110 may send a RRA message to the PCRF 130. The RAA message is a response to the RAR message in step 801.

Thus, the RAR and RAA is an alternative to the CCR and CCA.

Table described in relation to FIG. 2 provides an overview of the CCR, CCA, RAR and RAA messages, and is equally applicable to FIG. 8.

Step 803

The PGW 110 sends a Create Bearer Request message to the SGW 108. The SGW 108 receives the Create Bearer Request message from the PGW 110. The SGW 108 forwards the Create Bearer Request message to the MME 105. The MME 105 receives the Create Bearer Request message from the SGW 108.

The Create Bearer Request message may comprise information which indicates that EBI={0} is the bearer which should be created.

Step 804

The MME 105 sends a Modify Bearer Request message to the SGW 108. The SGW 108 receives the Modify Bearer Request message from the MME 105. The SGW 108 sends the Modify Bearer Request message to the PGW 110. The PGW 110 receives the Modify Bearer Request message from the SGW 108.

In one example, the Modify Bearer Request message comprises information which indicates that the bearer with EBI={5} is the one which should be modified (this is referred to as Alt. 1 in FIG. 8). When the SGW 108 receives the Modify Bearer Request message, it expects EBI={5} (referred to as Alt. A in FIG. 8). When the PGW 110 receives the Modify Bearer Request message, the PGW 110 expects EBI={5} (referred to as and Alt. A in FIG. 8).

In a second example alternative, the Modify Bearer Request message comprises information which indicates that the bearer with EBI={5,6} are the ones to be modified (this is referred to as Alt. 2 in FIG. 8). When the SGW 108 receives the Modify Bearer Request message, it expects EBI={5,6} (this is referred to as Alt. B in FIG. 8). When the PGW 110 receives the Modify Bearer Request message, it expects EBI={5,6} (this is referred to as Alt. B in FIG. 8).

Step 805

The SGW 108 sends a Create Bearer Response message to the PGW 110. The PGW 110 receives the Create Bearer Response message from the SGW 108.

The Create Bearer Response message comprises information which indicates that the bearer with EBI={6} is the one which should be created.

The cloud with the dotted lines in FIG. 8 indicates that messages sent over a certain interface may be sent in one order and be received at the other node in another order. In FIG. 8, the MME 105 may have sent the Create Bearer Response message to the SGW 108 before the Modify Bearer Request, but the Modify Bearer Request messages may (due to racing) reach the SGW 108 before the Create Bearer Response message reaches the SGW 108. The SGW 108 may send the Create Bearer Response message before the Modify Bearer Request message, but the Modify Bearer Request message may (due to racing) reach the PGW 110 before the Create Bearer Response message does. Such racing conditions may cause a bearer mismatch between the bearer(s) indicated in a message received by a gateway (e.g. EBI={5}) and the bearer(s) known by the gateway (e.g. EBI={5,6}), which bearers are associated with the same PDN connection and the same UE 101.

The SGW 108 may forward the messages to the PGW 110 in the same order as the SGW 108 receives them from the MME 105.

Then there can be a new racing over the S5/S8 interface.

As seen in FIG. 8, both the SGW 108 and the PGW 110 must handle racing and bearer mismatch.

Summarized, FIG. 8 shows that messages sent over a certain interface may be sent in one order and be received at the other node in another order. The MME 105 may send "message A" before "message B", but "message B" may (due to racing) reach the SGW 108 before "message A" does. The SGW 108 may send "message A" before "message B", but "message B" may (due to racing) reach the PGW 110 before "message A" does. Thus it is possible to have a racing condition over both S11/S4 and S5/S8 interfaces.

Case 2: Create Bearer Response arrives before Modify Bearer Request; Modify Bearer Request includes the newly created dedicated bearer(s); From the receiving node's point of view there is no problem.

FIG. 9 illustrates an example of a Racing Condition for a Create Bearer Response and Modify Bearer Request for case 2. Case 2 is also illustrated in FIGS. 13 and 14 which will be described below.

A precondition for FIG. 9 is that a Modify Bearer Request or Modify Access Bearers Request is sent from MME/S4-SGSN 105 while a Bearer Activation procedure is triggered from the PGW 110.

Normal case B: Create Bearer Response arrives before Modify Bearer Request; Modify Bearer Request includes the newly created dedicated bearer(s). At the receiving node (SGW 108, MME 105105): No problem.

Note that the situation may occur for the signaling over the S11/S4 interface between the MME/S4-SGSN 105 and the SGW 108, and also in the PGW 110 for signaling over S5/S8, S2a and over S2b.

At the start of the method in FIG. 9, the MME 105, the SGW 108 and the PGW 110 has information about that bearer with EBI={5} is activated. The method in FIG. 9 comprises at least some of the following steps, which steps may be performed in any suitable order than described below:

Step 900

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 901

The PGW 110 receives PCC rules from the PCRF 130, indicating that one or more dedicated bearers should be created.

The PCC rules are comprised in the RAR in the scenario where the PGW 110 sends the RAA message in step 901, i.e. a scenario where step 900 is not performed. The PCC rules are comprised in the CCA message in a scenario where the PGW 110 has sent a CCR message in step 900.

The PGW 110 receives the RAR or CCA message from the PCRF 130. The CCA is a response to the CCR in step 900.

When the PGW 110 has received and executed the PCC rules received from the PCRF 130 and when it has received the RAR message, the PGW 110 may send a RRA message to the PCRF 130. The RRA message is a response to the RAR message in step 900.

Thus, the RAR and RAA is an alternative to the CCR and CCA.

Table described in relation to FIG. 2 provides an overview of the CCR, CCA, RAR and RAA messages, and is equally applicable to FIG. 9.

Step 902

The PGW 110 sends a Create Bearer Request message to the SGW 108. The SGW 108 receives the Create Bearer Request message from the PGW 110. The SGW 108 forwards the Create Bearer Request message to the MME 105. The MME 105 receives the Create Bearer Request message from the SGW 108.

Step 903

The SGW 108 sends a Create Bearer Response message to the PGW 110. The Create Bearer Response message comprises information which indicates that the bearer with EBI={6} has been created.

Step 904

The SGW 108 sends a Modify Bearer Request message to the PGW 110. The PGW 110 receives the Modify Bearer Request message from the SGW 108. The Modify Bearer Request message comprises information which indicates that the bearers with EBI={5,6} are the ones that should be modified. The PGW 110 expects EBI={5,6} to be in the message from the SGW 108.

Similar to FIG. 8, the cloud and the crossed dotted lines within the cloud indicates that the MME 105 may send the message in a different order than they arrive at the PGW 110 which may cause a racing condition. Such racing conditions may cause a bearer mismatch between the bearer(s) indicated in a message received by a gateway (e.g. EBI={6}) and the bearer(s) known by the gateway (e.g. EBI={5,6}), which bearers are associated with the same PDN connection and the same UE 101.

Case 3: Modify Bearer Request arrives before Create Bearer Response; Modify Bearer Request includes the newly created dedicated bearer(s); From the receiving node's point of view the received Modify Bearer Request message contains one or more unknown bearers; The Create Bearer Response message contains the bearers that were "unknown" in the Modify Bearer Request message.

FIG. 10 illustrates an example of the Racing Condition with a Create Bearer Response and Modify Bearer Request for case 3. Case 3 is also illustrated in FIGS. 13 and 14 which will be described below.

A precondition for FIG. 10 is that the Modify Bearer Request or Modify Access Bearers Request is sent from MME/S4-SGSN 105 while a Bearer Activation procedure is triggered from the PGW 110.

Exceptional case A: Modify Bearer Request arrives before Create Bearer Response; Modify Bearer Request includes the newly created dedicated bearer(s). At the receiving node (SGW 108, MME 105): from the receiving node's point of view the received Modify Bearer Request message contains one or more unknown bearers.

Note that the situation may occur for the signaling over the S11/S4 interface between the MME/S4-SGSN 105 and the SGW 108, and also in the PGW 110 for signaling over S5/S8, S2a and over S2b.

At the start of the method in FIG. 10, the MME 105, the SGW 108 and the PGW 110 has information about that bearer with EBI={5} is activated. The method in FIG. 10 comprises at least some of the following steps, which steps may be performed in any suitable order than described below:

Step 1000

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 1001

The PGW 110 receives PCC rules from the PCRF 130, indicating that one or more dedicated bearers should be created. The PCC rules are comprised in the RAR in the scenario where the PGW 110 sends the RAA message, i.e. a scenario where step 1000 is not performed. The PCC rules are comprised in the CCA message in a scenario where the PGW 110 has sent a CCR message in step 1000. The PGW 110 receives the RAR or CCA message from the PCRF 130. The CCA is a response to the CCR in step 1000.

The PGW 110 receives the RAR or CCA message from the PCRF 130. When the PGW 110 has received and executed the PCC rules received from the PCRF 130 and when the RAA message has been received by the PGW 110, the PGW 110 may send a RRA message to the PCRF 130. The RAA message is a response to the RAR message in step 1001.

Thus, the RAR and RAA is an alternative to the CCR and CCA.

Table described in relation to FIG. 2 provides an overview of the CCR, CCA, RAR and RAA messages, and is equally applicable to FIG. 10.

Step 1002

The PGW 110 sends a Create Bearer Request message to the SGW 108. The SGW 108 receives the Create Bearer Request message from the PGW 110. The SGW 108 forwards the Create Bearer Request message to the MME 105. The MME 105 receives the Create Bearer Request message from the SGW 108.

Step 1003

The SGW 108 sends a Modify Bearer Request message to the PGW 110. The PGW 110 receives the Modify Bearer Request message from the SGW 108. The Modify Bearer Request message comprises information which indicates that the bearers with EBI={5,6} should be modified. As mentioned above, the PGW 110 only has information about EBI={5} as the activated bearer, and therefore only expects EBI={5} in the message from the SGW 108.

Step 1004

The SGW 108 sends a Create Bearer Response message to the PGW 110. The PGW 110 receives the Create Bearer Response message from the SGW 108. The Create Bearer Response message comprises information which indicates that the bearer with EBI={6} should be created.

As for the FIGS. 8 and 9, the cloud with the dotted crossed lines in FIG. 10 illustrates that the order in which the messages are sent from the MME 105 is not the same as the order in which the same messages are received by the PGW 110. In particular, the Create Bearer Response message is sent before the Modify Bearer Request message is sent from the MME 105, and the Modify Bearer Request message is received before the Create Bearer Response message at the PGW 110. As mentioned above, the PGW 110 only has information about EBI={5} as the activated bearer, and therefore only expects EBI={5} in the message from the SGW 108. So, when the Modify Bearer Request message indicates EBI={5,6}, there is a mismatch since EBI={6} is unknown to the PGW 110.

Case 4: Create Bearer Response arrives before Modify Bearer Request; Modify Bearer Request does not include the newly created dedicated bearer(s); From the receiving node's point of view one or more bearers are missing in the received Modify Bearer Request message; The Create Bearer Response message contains the bearers that were "missing" from the Modify Bearer Request message.

FIG. 11 illustrates an example of the Racing Condition for the Create Bearer Response and Modify Bearer Request according to case 4. Case 4 is also illustrated in FIGS. 13 and 14 which will be described below.

A precondition for FIG. 11 is that the Modify Bearer Request or Modify Access Bearers Request is sent from MME/S4-SGSN 105 while a Bearer Activation procedure is triggered from PGW.

Exceptional case B: Create Bearer Response arrives before Modify Bearer Request; Modify Bearer Request does not include the newly created dedicated bearer(s). At the receiving node (SGW 108, MME 105105): From the receiving node's point of view one or more bearers are missing in the received Modify Bearer Request message.

Note that the situation may occur for the signaling over the S11/S4 interface between the MME/S4-SGSN 105 and the SGW 108, and also in the PGW 110 for signaling over S5/S8, S2a and over S2b.

At the start of the method in FIG. 11, the MME 105, the SGW 108 and the PGW 110 has information about that bearer with EBI={5} is activated. The method in FIG. 11 comprises at least some of the following steps, which steps may be performed in any suitable order than described below:

Step 1100

The PGW 110 may send a CCR message to the PCRF 130. The sending of the CCR may be a result of a procedure initiated from the MME 105, e.g. a mobility procedure. The PCRF 130 may receive the CCR message from the PGW 110.

Step 1101

The PGW 110 receives PCC rules from the PCRF 130, indicating that one or more dedicated bearers should be created. The PCC rules are comprised in the RAR in the scenario where the PGW 110 sends the RAA message, i.e. a scenario where step 1100 is not performed. The PCC rules are comprised in the CCA message in a scenario where the PGW 110 has sent a CCR message in step 1100. The CCA is a response to the CCR in step 1100.

The PGW 110 receives the RAR or CCA message from the PCRF 130.

Step 1102

When the PGW 110 has received and executed the PCC rules received from the PCRF 130 and when the PGW 110 has received the RAR message, the PGW 110 may send a RRA message to the PCRF 130.

The RAA message is a response to the RAR message in step 1101.

Thus, the RAR and RAA is an alternative to the CCR and CCA.

Table described in relation to FIG. 2 provides an overview of the CCR, CCA, RAR and RAA messages, and is equally applicable to FIG. 11.

Step 1103

The PGW 110 sends a Create Bearer Request message to the SGW 108. The SGW 108 receives the Create Bearer Request message from the PGW 110. The SGW 108 forwards the Create Bearer Request message to the MME 105. The MME 105 receives the Create Bearer Request message from the SGW 108.

Step 1104

The SGW 108 sends a Create Bearer Response message to the PGW 110. The PGW 110 receives the Create Bearer Response message from the SGW 108. The Create Bearer Response message comprises information which indicates that the bearer with EBI={6} should be created.

Step 1105

The SGW 108 sends a Modify Bearer Request message to the PGW 110. The PGW 110 receives the Modify Bearer Request message from the SGW 108. The Modify Bearer Request message comprises information which indicates that the bearer with EBI={5} should be modified. However, the PGW 110 expected the Modify Bearer Response message to indicate EBI={5,6} since they are the ones which are created. Such racing conditions cause a bearer mismatch between the bearer(s) indicated in a message received by PGW 110 (e.g. EBI={5}) and the bearer(s) known by the PGW 110 (e.g. EBI={5,6}), which bearers are associated with the same PDN connection and the same UE 101.

As for the FIGS. 8, 9 and 10, the cloud with the dotted crossed lines in FIG. 11 illustrates that the order in which the messages are sent from the MME 105 is not the same as the order in which the same messages are received by the PGW 110. In particular, the Modify Bearer Request message is sent before the Create Bearer Response message is sent from the MME 105, and the Create Bearer Response message is received before the Modify Bearer Request message at the PGW 110.

The racing conditions described so far all have in common that they involve Modify Bearer Request/Modify Access Bearers Request and Create Bearer Response. Situations in which this is likely to occur are when:

a. A mobility procedure (TAU/RAU/Handover) is initiated in parallel with a dedicated bearer activation procedure.

b. A UE initiated service request procedure is initiated in parallel with a dedicated bearer activation procedure.

c. A dedicated bearer activation procedure is initiated while there are no active S1-U tunnels between the SGW 108 and the eNodeB 103, or no active S4-U tunnels between the SGW 108 and the S4-SGSN 118, or no active S12-U tunnels between the SGW 108 and the RNC, which triggers a network triggered service request procedure.

d. A dedicated bearer activation procedure is initiated in combination with the default bearer activation at Attach and UE 101 requested PDN connectivity procedures.

e. During other procedures, e.g. E-UTRAN 103 initiated E-RAB modification procedure, HSS based P-CSCF Restoration procedure, Presence Area Reporting and so on, where the MME 105 initiates Modify Bearer Request in parallel with a dedicated bearer activation procedure initiated from the PGW 110.

The above cases 1-4 describe a racing condition that involves the Create Bearer Request. Note that a racing condition may also occur for a Delete Bearer Request. The Delete Bearer Request is described in more detail with reference to case 5-8 in FIG. 14. The Create Bearer Request and the Delete Bearer Request have in common that the order in which the signals are received, as well as which bearers are expected by the receiving node bearers are the same, but the bearer mismatches are different (cf. FIGS. 13 and 14). The Create Bearer case 1 is similar to the Delete Bearer case 5. The Create Bearer case 2 is similar to the Delete Bearer case 6. The Create Bearer case 3 relates to an unknown bearer, but the Delete Bearer case 7 relates to a missing bearer. The Create Bearer case 4 relates to a missing bearer and the Delete Bearer case 8 relates to an unknown bearer. This is described in more detail with reference to FIGS. 13 and 14 below.

The fourth case listed above, "dedicated bearer activation procedure is initiated in combination with the default bearer activation at Attach and UE 101 requested PDN connectivity procedures", is described in 3GPP TS 23.401 Annex F. It may be referred to as the "piggybacking scenario", since it describes how Create Bearer Request can be piggybacked on a Create Session Response message, and Modify Bearer Request on a Create Bearer Response message. The standard does not state clearly whether the MME 105 should include the newly created bearer or not in the Modify Bearer Request. In the "piggybacking scenario" it may seem reasonable that the MME 105 would be aware of the newly created bearer at the time it sends the Modify Bearer Request. In the case piggybacking is not supported both possibilities (i.e. include or not include the newly created bearer) seems equally plausible. This racing condition is illustrated in FIG. 12. FIG. 12 illustrates an example of a Dedicated bearer activation in combination with the default bearer activation at Attach and UE requested PDN connectivity procedures.

The method in FIG. 12 comprises at least some of the following steps, which steps may be performed in any suitable order than described below:

Step 1201

The MME 105 sends a Create Session Request message to the SGW 108. The SGW 108 receives the Create Session Request message from the MME 105. The SGW 108 forwards the Create Session Request message to the PGW 110. The PGW 110 receives the Create Session Request message from the SGW 108. The Create Session Request message comprises information which indicates that the session for the bearer with EBI={5} should be created.

Step 1202

The PGW 110 receives PCC rules from the PCRF 130, indicating that one or more dedicated bearers should be created. The PGW 110 sends a CCR message to the PCRF 130. The PCC rules are comprised in a CCA message sent by the PCRF 130 to the PGW 110. The PGW 110 receives the CCA message from the PCRF 130.

Step 1203

The PGW 110 sends a Creates Session Response message to the SGW 108. The SGW 108 receives the Create Session Response message from the PGW 110. The SGW 108 sends the Create Session Response message to the MME 105. The MME 105 receives the Create Session Response message from the SGW 108. The Create Session Response message is a response to the Create Session Request message in step 1201.

Step 1204

The PGW 110 sends a Create Bearer Request message to the SGW 108. The SGW 108 receives the Create Bearer Request message from the PGW 110. The SGW 108 sends the Create Bearer Request message to the MME 105. The MME 105 receives the Create Bearer Request message from the SGW 108.

Step 1205

The SGW 108 may send a Modify Bearer Request message to the PGW 110. The PGW 110 may receive the Modify Bearer Request message from the SGW 110. The Modify Bearer Request message may comprise information which indicates that either the EBI={5} or EBI={5,6} should be modified.

Step 1206

The SGW 108 may send a Create Bearer Response message to the PGW 110. The PGW 110 may receive the Create Bearer Response message from the SGW 108. The Create Bearer Response comprises information which indicates that the bearer with EBI={6} should be created. The Create Bearer Response message is a response to the Create Bearer Request message in step 1204.

The cloud with the dotted crossed lines in FIG. 12 illustrates that the order in which the messages are sent from the MME 105 is not the same as the order in which the same messages are received by the PGW 110. In particular, the Create Bearer Response message is sent before the Modify Bearer Request message is sent from the MME 105, and the Modify Bearer Request message is received before the Create Bearer Response message at the PGW 110.

Step 1207

The PGW 110 may send a Modify Bearer Response message to the SGW 108. The SGW 108 may receive the Modify Bearer Response message from the PGW 110. The SGW 108 may send the Modify Bearer Response message to the MME 105. The MME 105 may receive the Modify Bearer Response message from the SGW 108.

FIG. 13 illustrates the four different cases 1-5 for a create bearer scenario in the SGW 108. A precondition for FIG. 13 is that the default bearer EBI={5} exists and that the SGW 108 has handled a Create Bearer Request message. Case 1-5 in FIG. 13 corresponds to cases 1-4 described above.

Case 1

In case 1, the SGW 108 first receives a Modify Bearer Request message with EBI={5} and the SGW 108 expects EBI={5}. The SGW 108 then concludes that the bearers match perfectly. The SGW 108 then receives a Create Bearer Response message with EBI={6}. The SGW 108 concludes with that the MME 105 has created a bearer with EBI={6}. In case 1, the Modify Bearer Request message is received before the Create Bearer Response message and there is no racing condition. Case 1 is also illustrated in FIG. 8.

Case 2

In case 2, the SGW 108 first receives a Create Bearer Response message with EBI={6}. The SGW 108 then concludes that the MME 105 has created the bearer with EBI={6}. The SGW 108 then receives a Modify Bearer Request message with EBI={5,6}, and the SGW 108 expects EBI={5,6}. Thus, the SGW 108 concludes with that the bearers match perfectly. In case 2, the Create Bearer Response message is received before the Modify Bearer Request message, and there is no racing condition. Case 2 is also illustrated in FIG. 9.

Case 3

In case 3, the SGW 108 first receives a Modify Bearer Request message with EBI={5,6} and the SGW 108 expects EBI={5}. The SGW 108 concludes that there is a bearer mismatch since EBI={6} is unknown. Case 3 is also illustrated in FIG. 10.

Unknown bearers are covered by the current standard. The SGW 108 should reply with (main) Cause set to "Request accepted partially", and Cause in Bearer Contexts set to "Request accepted" (for EBI={5}), and "Context not found" (for EBI={6}). The most probable effect of that is that MME 105 will delete the newly created bearer(s) locally. When the Create Bearer Response arrives the new bearer will be established in SGW 108 but it is deleted in MME 105.

So for case 3, there is a racing condition since the MME 105 sends the Create Bearer Response message before the Modify Bearer Request, but messages arrive at the SGW 108 in opposite order.

Case 4

The SGW 108 first receives a Create Bearer Response message with EBI={6}. The SGW 108 concludes that the MME 105 has created a bearer with EBI={6}. Secondly, the SGW 108 receives a Modify Bearer Request message with EBI={5} and the SGW 108 expects EBI={5,6}. The SGW 108 concludes that there is a bearer mismatch since EBI={6} is missing. Case 4 is also illustrated in FIG. 11.

The current standard does not give explicit directives on how to handle messages with missing bearers. A possible interpretation of the standard is that the message should be rejected with Cause set to "Mandatory IE missing". The most probable effect of that is that the MME will delete the entire PDN connection and send Delete Session Request.

There is racing condition in case 4 since the MME 105 sends the Modify Bearer Request message before the Create Bearer Response message, but messages arrive at the SGW 108 in opposite order.

FIG. 14 illustrates four different cases 5-8 for a delete bearer scenario in the SGW 108. A precondition for FIG. 14 is that the default bearer with EBI={5} and the dedicated bearer with EBI={6} exists, and that the SGW 108 has handled a Delete Bearer Request message for EBI={6}.

Case 5

In case 5, the SGW 108 first receives the Modify Bearer Request message with EBI={5,6} and the SGW 108 expects EBI={5,6}. The SGW 108 concludes that the bearers match perfectly. Then, the SGW 108 receives the Delete Bearer Response message and the SGW 108 concludes that the MME 105 has deleted the bearer with EBI={6}. The SGW 108 also deletes the bearer with EBI={6}, and forwards the Delete bearer Response message to the PGW 110. So in case 5, the Modify Bearer Request message is received before the Delete Bearer Response message and there is no racing condition. Case 5 in FIG. 14 is similar to case 1 illustrated in FIG. 9 except that FIG. 14 is for a Delete Bearer Response and FIG. 9 is for a Create Bearer Response message.

Case 6

In case 6, the SGW 108 first receives the Delete Bearer Response message with EBI={6}. The SGW 108 concludes that the MME 105 has deleted the bearer with EBI={6}. The SGW 108 also deletes the bearer with EBI={6}, and forwards the Delete Bearer Response message to the PGW 110. Secondly, the SGW 108 receives the Modify Bearer Request message with EBI={5} and the SGW expects EBI={5} in the message. The SGW 108 concludes that the bearers match perfectly. So in case 6, the Delete Bearer Response message is received before the Modify Bearer Request message and there is no racing condition. This corresponds to case 2 illustrated in FIG. 8.

Case 7

In case 7, the SGW 108 first receives the Modify Bearer Request message with EBI={5} and the SGW 108 expects EBI={5,6} in the message. The SGW 108 concludes that there is a bearer mismatch and that EBI={6} is missing.

The current standard does not give explicit directives on how to handle messages with missing bearers. A possible interpretation of the standard is that the message should be rejected with Cause set to "Mandatory IE missing". The most probable effect of that is that the MME will delete the entire PDN connection and send Delete Session Request.

Secondly, in case 7, the SGW 108 receives the Delete Bearer Response message with EBI={6}, and the SGW 108 concludes that the MME 105 has deleted the bearer with EBI={6}. The SGW 108 also deletes the barer with EBI={6}, and forwards the Delete Bearer Response message to the PGW 110.

Thus, in case 7 there is a racing condition since the MME 105 sends the Delete Bearer Response message before the Modify Bearer Request message, but the messages arrive at the SGW 108 in opposite order.

Case 7 in FIG. 14 is similar to case 3 illustrated in FIG. 10 except that FIG. 14 is for a Delete Bearer Response and FIG. 10 is for a Create Bearer Response message.

Case 8

In case 8, the SGW 108 first receives the Delete Bearer Response message with EBI={5} and the SGW 108 concludes that the MME 105 has deleted the bearer with EBI={6}. The SGW 108 also deletes the bearer with EBI={6}, and forwards the Delete Bearer Response message to the PGW 110. Secondly, the SGW 108 receives the Modify Bearer Request message with EBI={5,6} and the SGW 108 expects EBI={5,6} in the message. The SGW 108 then concludes with that there is a bearer mismatch and that EBI={6} is unknown.

As mentioned earlier, unknown bearers are covered by the current standard. The SGW 108 should reply with (main) Cause set to "Request accepted partially", and Cause in Bearer Contexts set to "Request accepted" (for EBI=5), and "Context not found" (for EBI=6). In the "Delete scenario" this does not cause any problems.

In case 8, the MME 105 sends the Modify Bearer Request message before the Delete Bearer Response message, but the messages arrive at the SGW 108 in opposite order Case 8 in FIG. 14 is similar to case 4 illustrated in FIG. 11 except that FIG. 14 is for a Delete Bearer Response and FIG. 11 is for a Create Bearer Response message.

The racing conditions described so far include Create Bearer Request/Response, and Modify Bearer Request or Modify Access Bearers Request. Similar racing conditions can occur with Delete Bearer Request/Response, and Modify Bearer Request or Modify Access Bearers Request.

The current standard covers Permanent Bearer Mismatch with Unknown Bearers well enough. The mechanism provides feedback to the originating node, which makes it possible for the originating node to deactivate the bearer(s) that were unknown to the receiving node.

The current standard does not cover Temporary Bearer Mismatch (in racing conditions). The current standard does not cover Missing Bearers well enough.

The current standard seems to have been written from the perspective that each procedure takes place in isolation, from the perspective that two procedures never take place at the same time, and that signaling racing conditions have no effect on the involved procedures.

SUMMARY

An objective of embodiments herein is therefore to obviate at least one of the above disadvantages and to provide improved handling of bearers.

According to a first aspect, the object is achieved by a method performed by a gateway for handling bearers in a communications system. The gateway detects that a procedure for activating or deactivating a bearer has been initiated. The bearer is associated with a PDN connection and a UE. The gateway receives a first modify bearer or modify access bearers request message from a mobility node for the same PDN connection and UE as the bearer activation or deactivation procedure is intended for, which message identifies a first set of bearers associated with said same PDN connection and UE. The gateway detects at least one bearer mismatch between the first set of bearers and a second set of bearers known by the gateway and associated with said same PDN connection and UE. The gateway accepts, during a predetermined time interval from the procedure has been detected, the received modify bearer or modify access bearers request message even though the bearer mismatch has been detected.

According to a second aspect, the object is achieved by a method performed by a mobility node for handling bearers in a communications system. The mobility node receives information associated with a bearer mismatch from a gateway. Based on the received information, the mobility node determines if there is a need for a further action associated with the bearer mismatch.

According to a third aspect, the object is achieved by a gateway for handling bearers in a communications system. The gateway being adapted to detect that a procedure for activating or deactivating a bearer has been initiated. The bearer is associated with a PDN connection and a UE. The gateway is adapted to receive a first modify bearer or modify access bearers request message from a mobility node for the same PDN connection and UE as the bearer activation or deactivation procedure is intended for. The message identifies a first set of bearers associated with said same PDN connection and UE. The gateway is adapted to detect at least one bearer mismatch between the first set of bearers and a second set of bearers known by the gateway and associated with said same PDN connection and UE. Furthermore, the gateway is adapted to accept, during a time interval from the procedure has been detected, the received modify bearer or modify access bearers request message even though the bearer mismatch has been detected.

According to a fourth aspect, the object is achieved by a mobility node for handling bearers in a communications system. The mobility node is adapted to receive information associated with a bearer mismatch from a gateway. The mobility node is adapted to, based on the received information, determine if there is a need for a further action associated with the bearer mismatch.

Since the received modify bearer or modify access bearers request message is accepted during a predetermined time interval from the procedure has been detected, even though the bearer mismatch has been detected, the handling of the bearers has been improved. With this, a signaling racing condition is well handled and no bearers are unintentionally deleted.

Embodiments herein afford many advantages, of which a non-exhaustive list of examples follows:

One advantage of the embodiments herein is to eliminate or at least significantly reduce the risk that newly created bearers are unintentionally deleted as a result of signaling racing conditions, without compromising with information consistency between nodes.

When there is a racing condition between a Modify Bearer Request or Modify Access Bearers Request, and a Create Bearer Request/Response, an advantage of the embodiments herein is that the following is eliminated or at least significantly reduced: Unintentional deletion of newly created bearers; Unintentional deletion of entire PDN connections.

When there is a racing condition between a Modify Bearer Request or Modify Access Bearers Request, and a Delete Bearer Request/Response, another advantage of the embodiments herein is that the following is eliminated or at least significantly reduced: Unintentional deletion of entire PDN connections.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 13 is a table showing an overview of a create scenario for case 1-4 in the SGW.

FIG. 14 is a table showing an overview of a delete scenario for case 5-8 in the SGW.

The drawings are not necessarily to scale and the dimensions of certain features may have been exaggerated for the sake of clarity. Emphasis is instead placed upon illustrating the principle of the embodiments herein.

DETAILED DESCRIPTION

Figure 15:
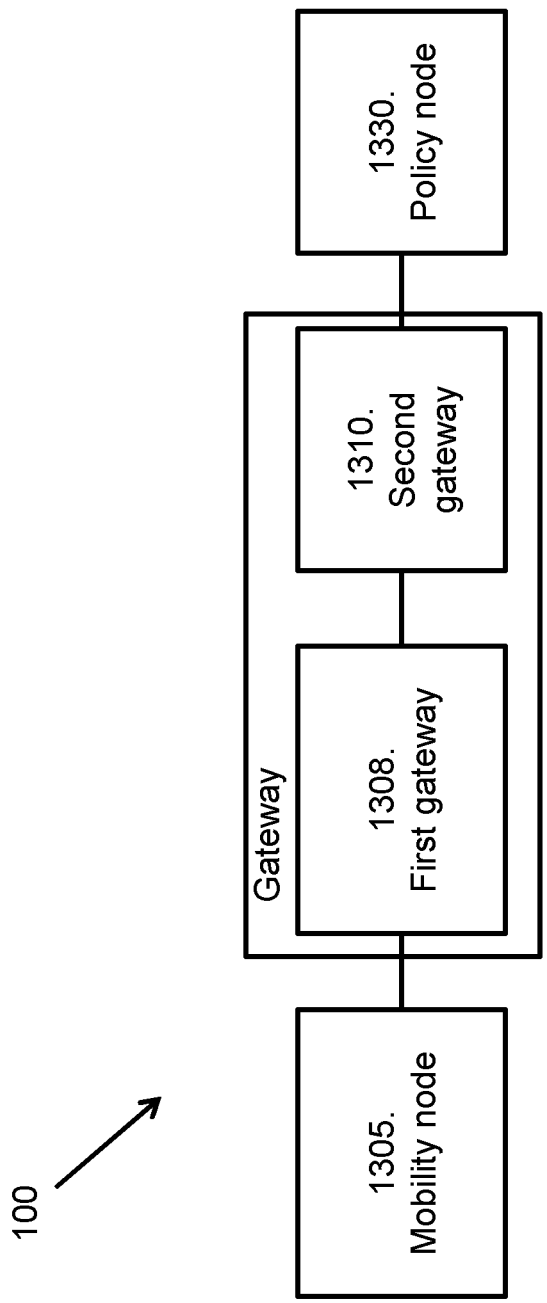
FIG. 15 is a schematic block diagram illustrating embodiments of a communications system.

FIG. 15 depicts a communications system 100 in which embodiments discussed herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies (both 3GPP and non-3GPP technologies) such as e.g. WLAN. The communications network 100 may be referred to as a wireless communications network, a wireless network, a wireless communications system, a system or a network.

The communications system 100 comprises a mobility node 1305, a first gateway 1308, a second gateway 1310 and a policy node 1330.

The mobility node is a node which is responsible for handling mobility procedures in the communications system 100, it is involved in the bearer activation/deactivation process etc. The mobility node 1305 may correspond to the MME 105 in FIG. 1, an S4-SGSN, a combined MME/S4-SGSN, an ePDG, a TWAN, a vMME, a vSGSN etc. The mobility node 1305 may be an actual node or it may be a function implemented in a node.

Figure 1:
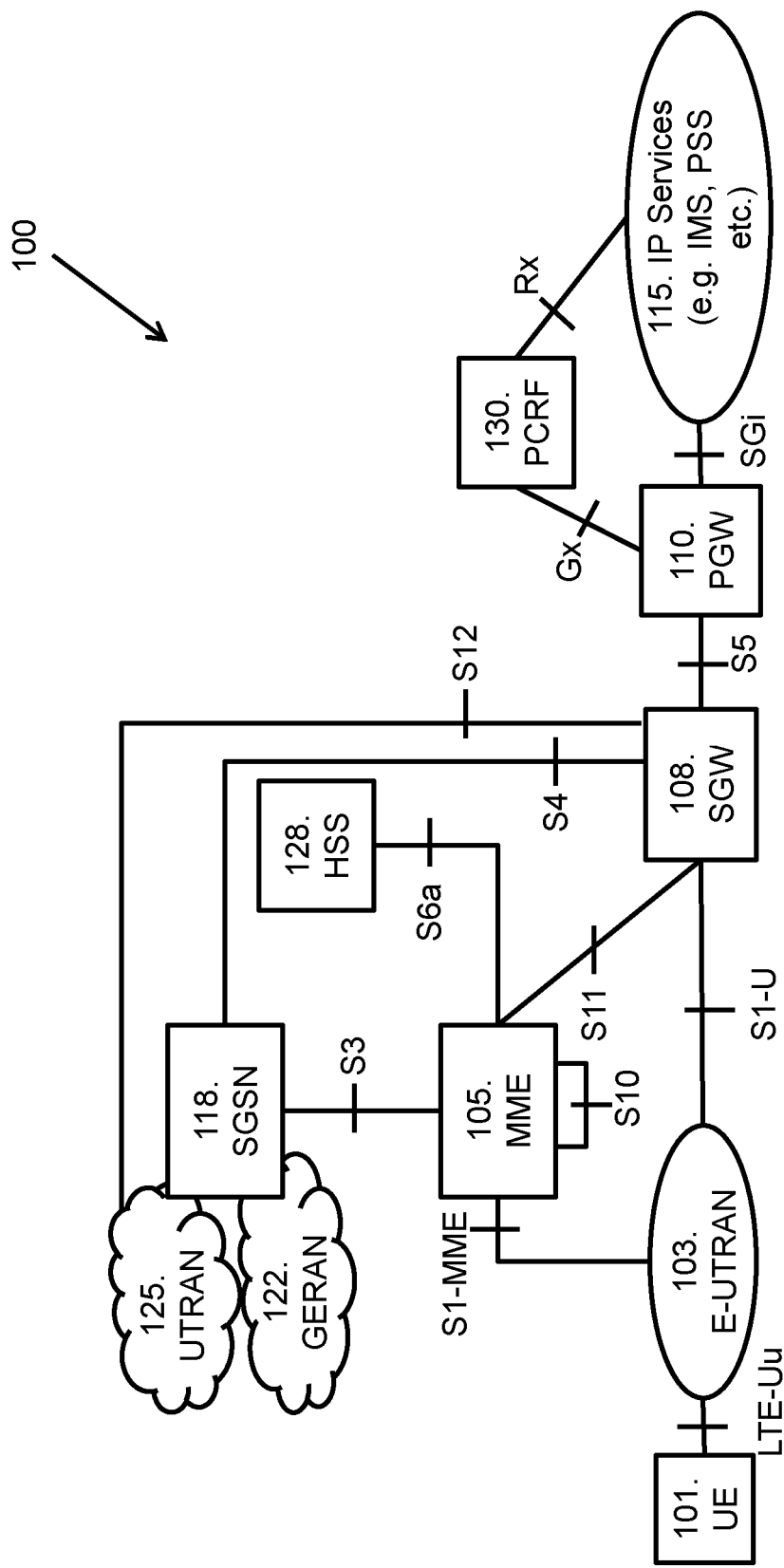
FIG. 1 is a schematic block diagram illustrating a known communications system wherein embodiments of the present solution can be implemented.
Figure 2:
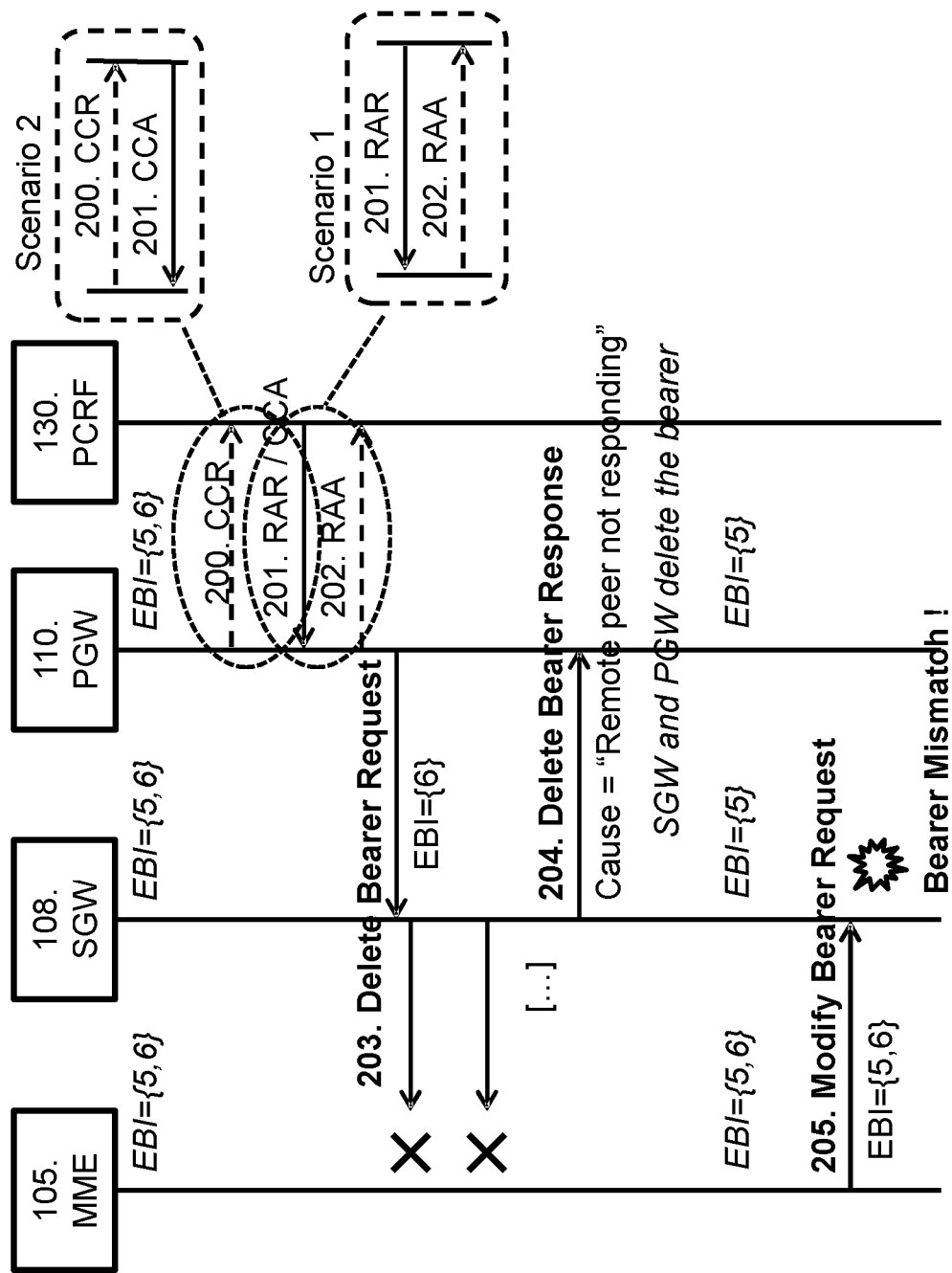
FIG. 2 is a signaling diagram illustrating an example of Bearer Mismatch as a Result of a Connectivity Problem or a Temporary Overload.
Figure 3:
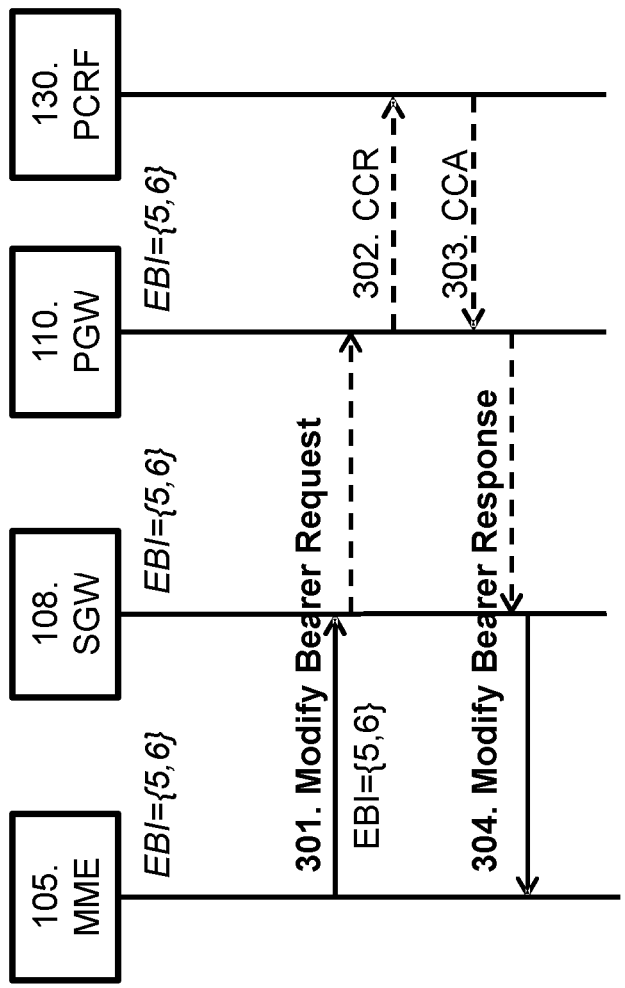
FIG. 3 is a signaling diagram illustrating a Procedure Using Modify Bearer Request.
Figure 4:
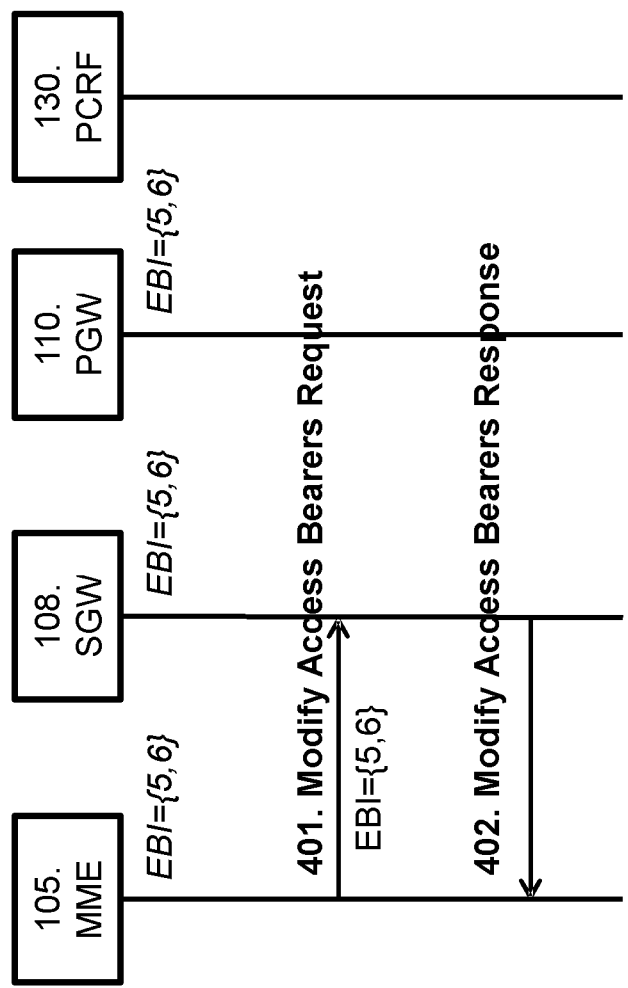
FIG. 4 is a signaling diagram illustrating a procedure Using Modify Access Bearers Request.
Figure 5:
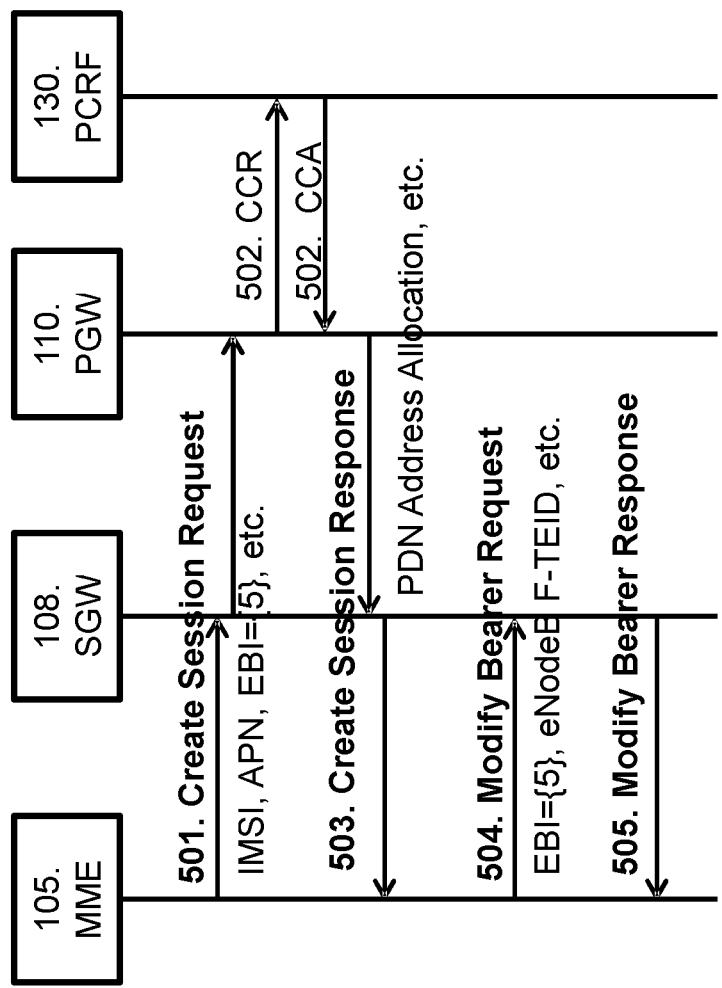
FIG. 5 is a signaling diagram illustrating a Default Bearer Activation procedure.
Figure 6:
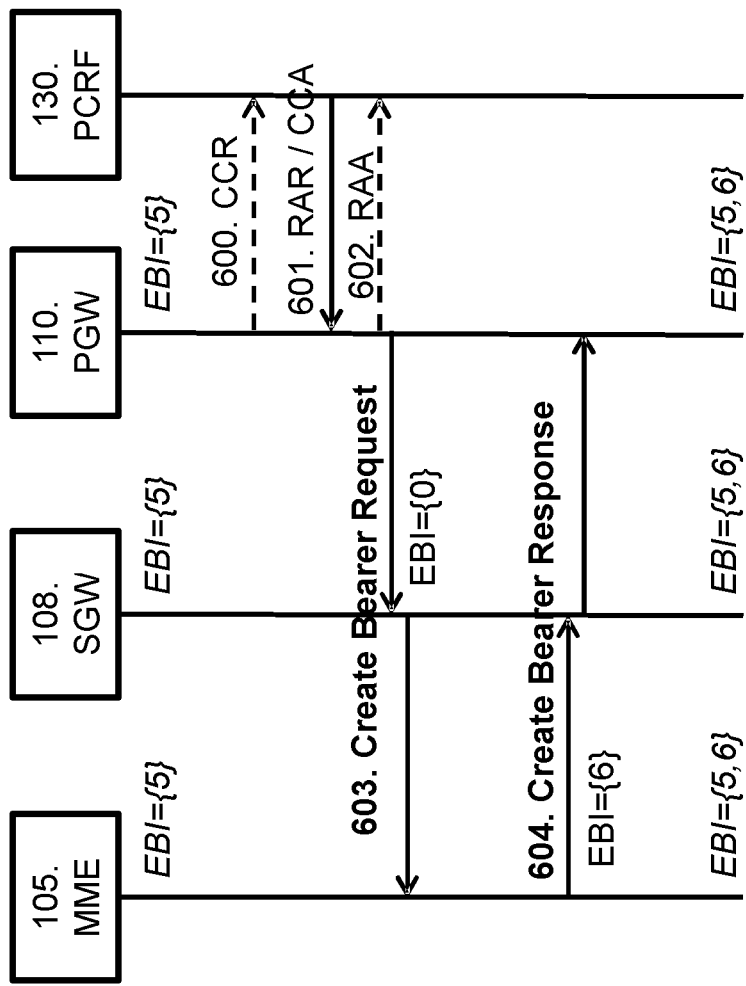
FIG. 6 is a signaling diagram illustrating a Dedicated Bearer Activation procedure.
Figure 7:
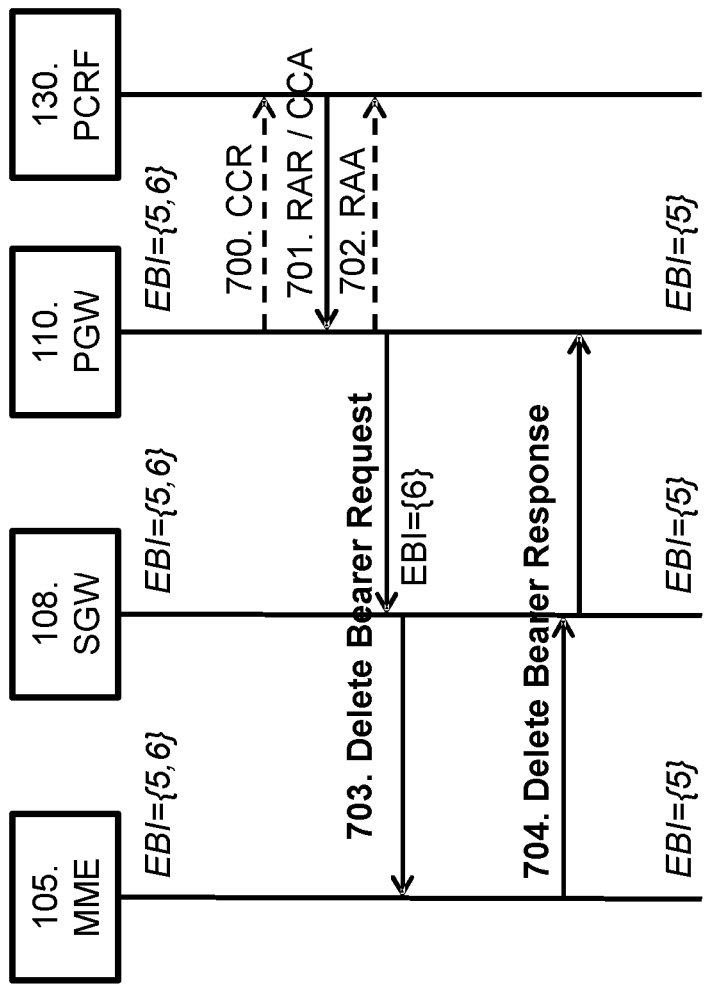
FIG. 7 is a signaling diagram illustrating a Bearer Activation Procedure.
Figure 8:
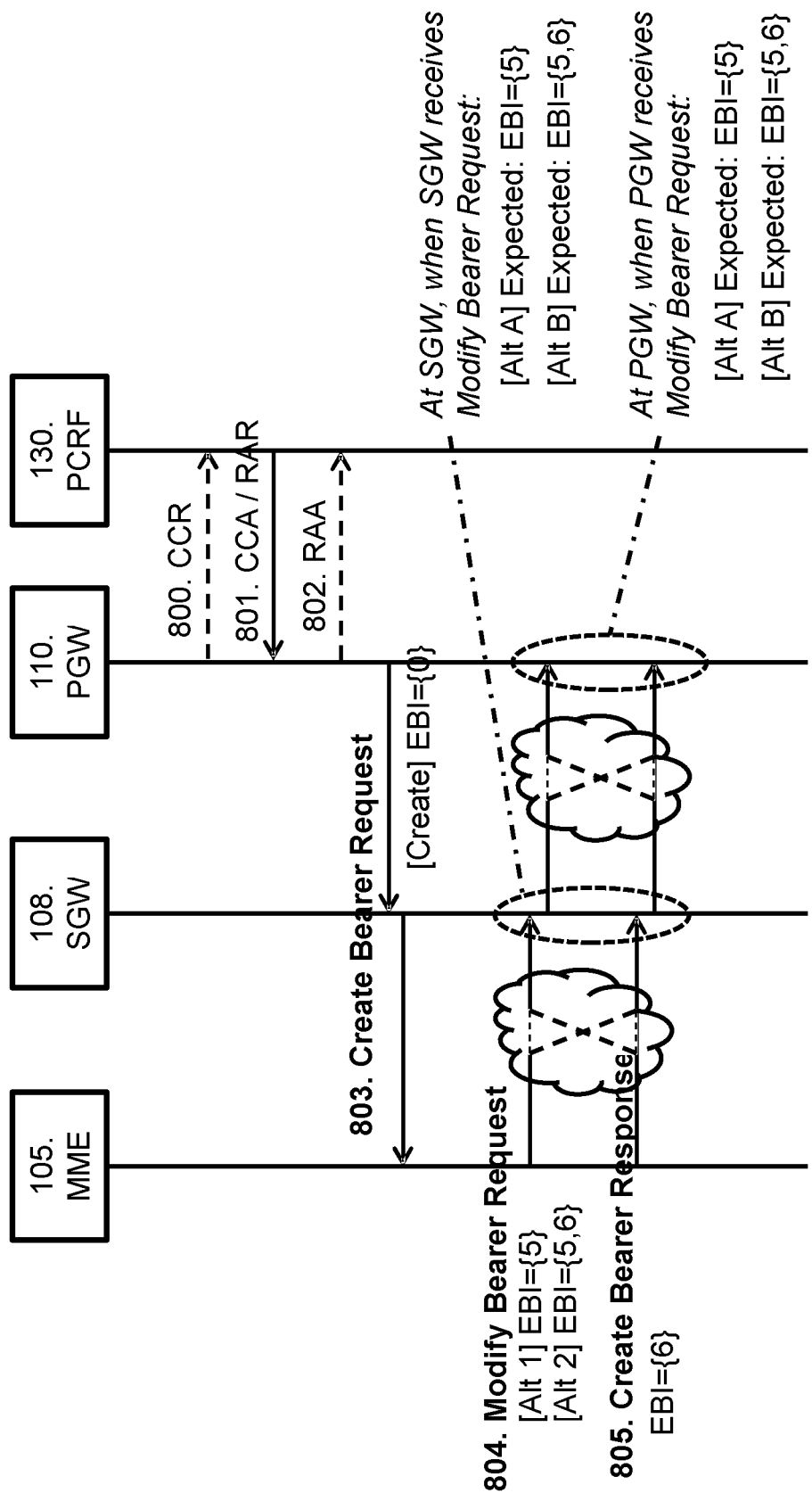
FIG. 8 is a signaling diagram illustrating a procedure for Racing Condition: Create Bearer Response and Modify Bearer Request, case 1.
Figure 9:
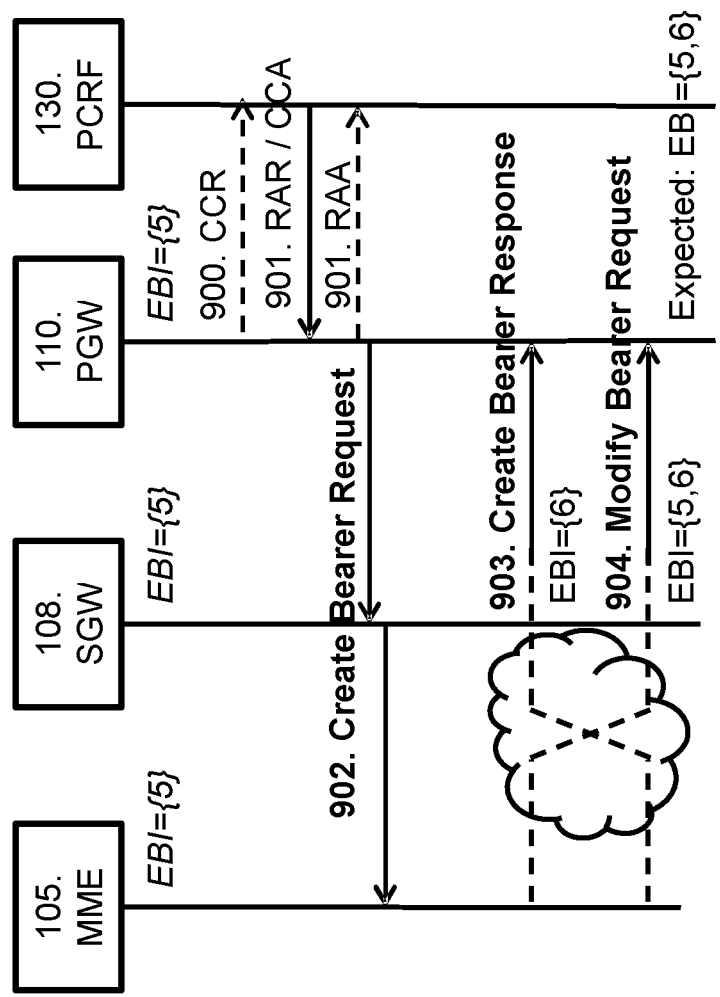
FIG. 9 is a signaling diagram illustrating a procedure for Racing Condition: Create Bearer Response and Modify Bearer Request, case 2.

The first gateway 1308 may for example correspond to a SGW as in FIG. 1 and the second gateway 1310 may for example correspond to a PGW 110 as in FIG. 1. Each of the gateways may be actual gateway nodes or they may be functions implemented in a node. The term gateway may be used when referring to any of the first and second gateways. Both the reference numbers 1308, 1310 will be used when referring to any of the first and second gateways.

The policy node 1330 is a node which is responsible for handling policies in the communications system 100. The policy node 1330 may correspond to a PCRF 130 as in FIG. 1. The policy node 1330 may be an actual policy node or it may be a function implemented in a node.

The mobility node 1305 may be connected to the first gateway 1308, the first gateway 1308 may be connected to the second gateway 1310 and the second gateway 1310 may be connected to the policy node 1330.

An overview of the nodes in the communications system 100 is seen in
Table below:

TABLE 2

| 1301. Mobility node | Gateway | | 1330. Policy node |
|---|---|---|---|
| | 1308. First gateway | 1310. Second gateway | |
| MME | SGW | PGW | PCRF |
| S4-SGSN | SGW | PGW | PCRF |
| MME/S4-SGSN | | | PCRF |
| ePDG | SGW | PGW | PCRF |
| TWAN | SGW | PGW | PCRF |

It should be noted that the communication links in the communications system 100 may be of any suitable kind including either a wired or wireless link. The link may use any suitable protocol depending on type and level of layer (e.g. as indicated by the OSI model) as understood by the person skilled in the art. Further note that the communications system 100 exemplified in FIG. 15 may comprise additional nodes and entities, such as e.g. the nodes illustrated in FIG. 1. However, only the mobility node 1305, the first gateway 1308, the second gateway 1310 and the policy node 1330 are illustrated in FIG. 15 for the sake of simplicity.

The method for handling bearers in a communications system, according to some embodiments will now be described with reference to the signaling diagram in FIG. 16. The method comprises the following steps, which steps may as well be carried out in another suitable order than described below:

Step 1401

At least one of the mobility node 1301, the gateway 1308, 1310 and the policy node 1310 may inform each other that they support handling of bearer mismatch. The bearer may be an EPS bearer. The bearer may be a dedicated bearer. This may be done by transmission of support information.

It is not necessary that all of the mobility node 1301, the gateway 1308, 1310 and the policy node 1310 support the handling of bearer mismatch. For example, it may be only the first gateway 1308 corresponding to the SGW 108 which support the handling of bearer mismatch (in procedures with only S11/4 signaling and no S5/S8 signaling), i.e. the mobility node 1301 corresponding to the MME 105 and the second gateway 1310 corresponding to the PGW 110 does not have to support it.

For procedures in which the Modify Bearer Request/Modify Access Bearers Request messages are sent only over the S11/S4 interval (i.e. when there is no S5/S8 signaling), the PGW 110 (in an example where the second gateway 1310 corresponds to the PGW 110) does not necessarily need to support the handling of bearer mismatch.

The embodiments described herein works even if the MME/S4-SGSN 105 (in an example where the mobility node 1301 corresponds to the MME/S4-SGSN 105) does not support the handling of the bearer mismatch. The reason it works even in these cases is that SGW 108 (in an example where the first gateway 1308 corresponds to the SGW 108) actually accepts the Modify Bearer Request/Modify Access Bearers Request message even if there is a (temporary) bearer mismatch between the message and the information stored in the SGW 108. The MME 105 does not need to do anything.

In an alternative embodiment, the SGW 108 may reject the "failing" bearers but keep them, and let the MME 105 decide whether to keep or delete the "failing" bearers. In such embodiment, the MME/S4-SGSN 105 needs to support the handling of bearer mismatch.

The step of informing of the support for handling bearer mismatch may also be referred to as a capability exchange between at least some of the mobility node 1301, the gateway 1308, 1310 and the policy node 1310. The following list presents two examples of how the capability exchange may be performed:
  i. Using a Supported feature announcement with Echo request/response messages.
  ii. Using PDN connection signaling, i.e. to include a support indication in Create Session Request/Response messages (for PDN connection creation procedure) and Modify Bearer Request/Response messages for a SGW relocation procedure.

Step 1402

The gateway 1308, 1310 detects that a procedure for activating or deactivating a bearer has been initiated. The bearer is associated with a PDN connection and a UE 101. The procedure for activating a bearer may correspond to a Create Bearer Request procedure (e.g. step 1504 in FIG. 15) and the procedure for deactivating a bearer may correspond to a Delete Bearer Request procedure.

Step 1403

The gateway 1308, 1310 may start a timer when the procedure has been detected. A time interval lasts while the timer is running. The timer may a period that the risk of a racing condition in the communication system 100 has increased since the bearer activation or deactivation procedure has been initiated. The timer may expire after a predetermined amount of time. The timer may correspond to a certain period after the procedure has been detected.

This period may be achieved in some alternative ways in addition to the use of a timer, which will be described in detail with reference to step 1406 below.

In step 1403, the gateway 1308, 1310 may also set a flag when the procedure has been detected. The flag may indicate that the bearer activation or deactivation procedure is pending. The flag may be a dedicated bearer activation flag or a dedicated bearer deactivation flag.

In some embodiments, the timer may be started. In other embodiments, the flag may be set. In yet further embodiments, both the timer and the flag may be started and set.

Step 1404

The mobility node 1301 sends a first modify bearer or modify access bearers request message to the gateway 1308, 1310 for the same PDN connection and UE 101 as the bearer activation or deactivation procedure is intended for. The gateway 1308, 1310 receives the first modify bearer or modify access bearers request message from the mobility node 130. The message identifies a first set of bearers associated with said same PDN connection and UE 101. The first set may be e.g. EBI={5,6}.

Step 1405

The gateway 1308, 1310 detects at least one bearer mismatch between the first set of bearers and a second set of bearers known by the gateway 1308, 1310 and associated with said same PDN connection and UE 101. The first set of bearers may also be referred to as a first set of bearer contexts, and the second set of bearers may also be referred dot as a second set of bearer contexts.

The first set may be e.g. EBI={5,6} and the second set may be EBI={5}.

In an example of a Modify (access) Bearer Request message, the message shall contain a complete set of bearer context for the given (UE 101) [for the modify access bearer request case]) PDN connection. Thus, the MME/SGW/PGW 105, 108, 110 is able to detect any possible mismatch.

The first set of bearers is included in the messages (Modify Bearer Request or Modify Access Bearers Request) from the mobility node 1301, and the second set of bearers is a list stored in the receiving node, i.e. the gateway 1308, 1310 (for example the SGW 108 and/or the PGW 108).

Step 1406

The gateway 1308, 1310 accepts, during a time interval from the procedure has been detected, the received modify bearer or modify access bearers request message even though the bearer mismatch has been detected.

The time interval may last while the timer in step 1403 is running. The time interval may last while the flag in step 1403 is set.

For example, the time interval may last until some kind of acknowledge message or similar is received. The time interval may last until the first modify bearer or the modify access bearers request message is received without any bearer mismatch. It may e.g. be that the MME 105 determines to send some kind of message to the gateway 1308, 1310, where the message is associated with the mismatch detected in step 1405 and reported to the MME 101 in step 1407. In such cases there is not necessarily any timer in use in the gateway 1308, 1310 (possibly in the MME 105). Also, it may be that the time interval may last until the next modify bearer request or modify access bearer request is received by the gateway 1308, 1310. The gateway 1308, 1310 may receive two consecutive Modify Bearer Request messages within the time interval, and then both Modify Bearer Request messages should be accepted.

The time interval may be a predetermined time interval. The time interval may be predetermined in that the timer is set to a certain predetermined value in seconds or similar.

The gateway 1308, 1310 does not have to use a timer, but only a flag.

An advantage with the timer is that it covers the case where no Modify Bearer Request is received (and hence no racing).

By only using a flag and no timer, a faulty Modify Bearer Request message that arrives "much later" may be erroneously accepted. However, the possible mistake will be corrected at the next Modify Bearer Request message.

When the gateway 1308, 1310 receives a Create/Delete Bearer Request message, the gateway 1308, 1310 sets the flag and (optionally) sets the timer. The gateway 1308, 1310 may clears the flag when the gateway 1308, 1310 has replied to the first Modify Bearer Request after the Create/Delete Bearer Request message, or when the timer (if set) elapses, whichever occurs first.

Below is a list of some examples of the flag and timer: A) Timer (the timer can serve as a flag); B) Timer and flag; C) Flag only.

Step 1407

The gateway 1308, 1310 may transmit information associated with the bearer mismatch to the mobility node 1305. The mobility node 1305 may receive the information associated with the bearer mismatch from the gateway 1308, 1310.

The information associated with the bearer mismatch may indicates at least one bearer which is missing or unknown in the first received modify bearer or modify access bearers request message.

Step 1408

Based on the information received in step 1407, the mobility node 1305 may determine if there is a need for a further action associated with the bearer mismatch.

Step 1409

The gateway 1308, 1310 may detect that the timer has expired, i.e. the timer which may have been started in step 1403.

The timer may expire or end, either detecting the mismatch, or detecting a match, or when the timer is a predefined timer (e.g. N3×T3, taking into account of GTP re-transmission).

Step 1410

The mobility node 1301 may send a subsequent modify bearer or modify access bearers request message to the gateway 1308, 1310 after the timer has expired. The gateway 1308, 1310 may receive the subsequent modify bearer or modify access bearers request message from the mobility node 1301 after the timer has expired. The message identifies a third set of bearers associated with said same PDN connection and UE 101. The message is subsequent to the first modify bearer or modify access bearers request message in step 1404.

Step 1411

When the timer has expired, the gateway 1308, 1310 may detect at least one bearer mismatch between the third set of bearers and the second set of bearers known by the gateway 1308, 1310 and associated with said same PDN connection and UE 101.

Step 1412

The gateway 1308, 1310 may apply error handling of the bearer mismatch when the timer has expired. The error handling may be for example rejection, partial accept, local deletion of bearers etc.

Figure 17:
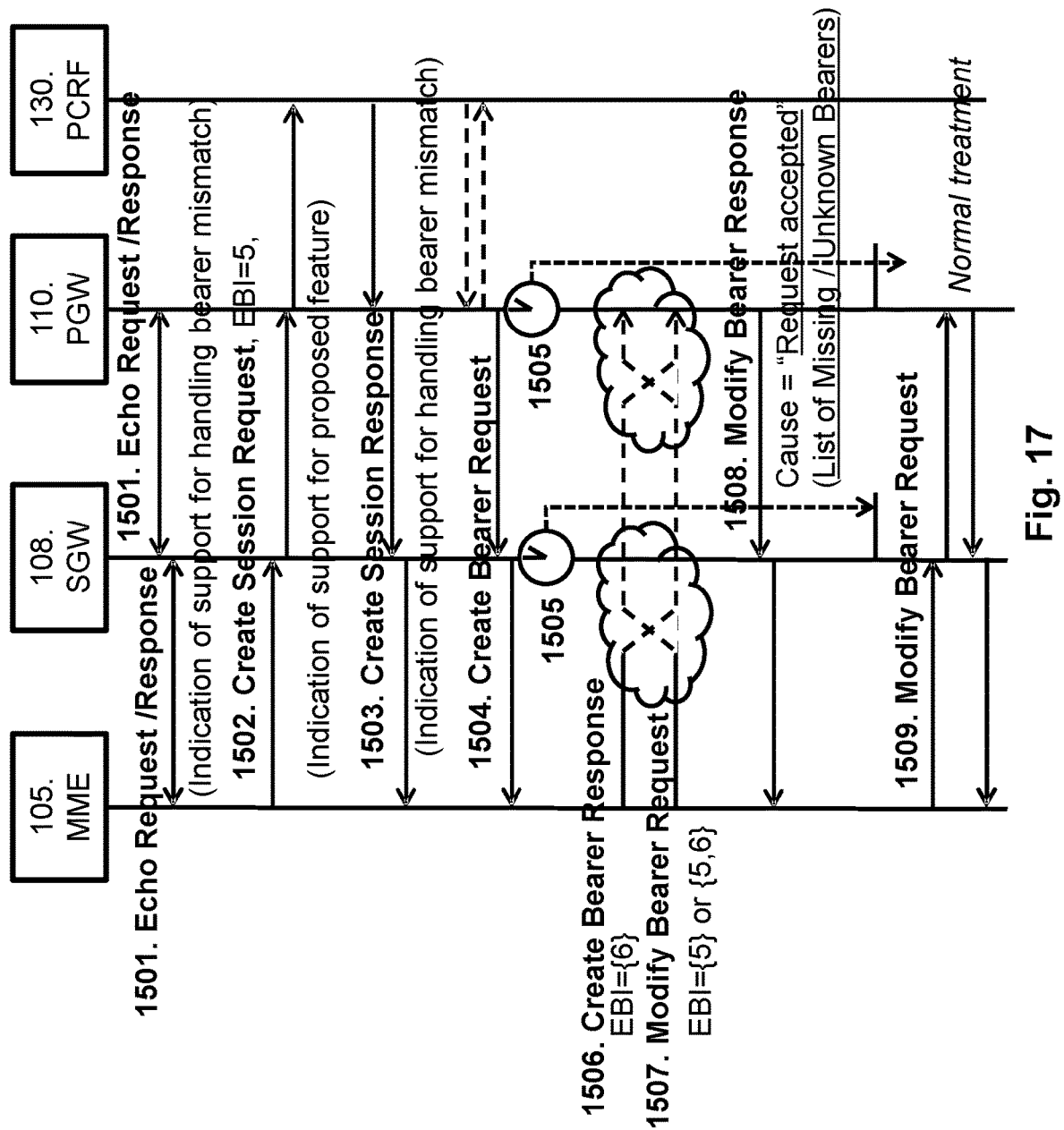
FIG. 17 is a signaling diagram illustrating embodiments of a method.

An example of the method above will now be described with reference to FIG. 17. In FIG. 17, the mobility node 1305 is exemplified with an MME 105, the first gateway 1308 is exemplified with a SGW 108, the second gateway 1310 is exemplified with a PGW 110 and the policy node 1330 is exemplified with a PCRF 130. The method illustrated in FIG. 17 comprises at least some of the following steps, which steps may be performed in any suitable order than described below:

Step 1501-1503

The MME 105, the SGW 108 and the PGW 110 indicate their support for the proposed solution/feature for handling of bearer mismatch, either by using Echo Request/Response (as described in the GTP standard) or by using a dedicated indication or flag in the Create Session Request/Response message. So, using the Echo Request/Response is an alternative to using a flag in the Create Session Request/Response message.

In detail, the PGW 110 may send an Echo Request message to the SGW 108. The Echo request may comprise an indication of that the PGW 110 supports the handling of bearer mismatch according to the embodiments herein. The SGW 108 may receive the Echo Request message from the PGW 110, and the SGW 110 may sends an Echo Reply message to the PGW 110 also indicating that the SGW 110 supports the handling of bearer mismatch. Similarly, the SGW 108 may send an Echo Request message to the MME 105 with an indication of that the SGW 108 supports the handling of bearer mismatch. The MME 105 receives the Echo Request, and the MME 105 sends an Echo Reply to the SGW 110 with an indication of that the MME 105 supports the handling of bearer mismatch. Thus, all nodes in the communications system 100 may have information indicating that the other nodes also support the handling of bearer mismatch.

As an alternative to the Echo Request/Response, as mentioned above, the MME 105 may send a Create Session Request message to the SGW 108 comprising an indication of the support of handling of bearer mismatch. The SGW 108 may forward the message to the PGW 110, and the PGW 110 may forward the message to the PCRF 130. The PCRF 130 may send a Create Session Response message to the PGW 110 comprising an indication of the support of handling of bearer mismatch. The PGW 110 may forward the Create Session Response message to the SGW 108, and the SGW 108 may forward the Create Session Response message to the MME 105. The Create Session Request and Response messages may comprise the indication in the form of a flag.

The support for the embodiments described herein for handling for bearer mismatching during the possible race condition needs a handshake between the SGW 108 and the PGW 110, and between the SGW 108 and the MME 105. The purpose of the handshake is that the nodes in the communications system 100 inform each other about their support for handling of bearer mismatch. The handshake refers to either the Echo Request/Response or the Create Session Request message comprising the indication of the support of handling of bearer mismatch described above. The handshake may be provided by using Supported feature advertisement as specified in TS 29.274, version 13.4.0, sub clause 11. In general, a node supporting at least one feature defined in the Node Features IE shall support dynamic discovery of supported features. The Supported feature advertisement involves that a node shall signal to a direct peer node the list of features it supports by sending the Sending Node Features IE in the Echo Request and Echo Response messages. The peer receiving the Sending Node Features IE shall store the list of features supported by the sending node per IP address and only update this list based on the Sending Node Features IE in the Echo Request and Echo Response messages, and it shall only use common supported features to initiate subsequent GTPv2 messages towards this IP address.

The Supported feature advertisement is useful since, e.g. for the case when Create Bearer Response is received first (the new bearer has been created); while the Modify Bearer Request contains no newly created bearer, if only SGW 108 support the embodiments described herein, while PGW 110 does not support, there may be a risk, that PGW 110 considering that the new dedicated bearer is not created, and initiated a new creation procedure.

As an alternative, such exchange of the support for such handling for bearer mismatching during the possible race condition may be done during PDN connection establishment and updated during a SGW 108 relocation procedure.

Step 1504

The PGW 110 sends a Create Bearer Request message to the SGW 108. The SGW 108 receives the Create Bearer Request message. The SGW 108 forwards the Create Bearer Request message to the MME 105.

Step 1505

When the SGW 108 and the PGW 110 receives Create Bearer Request, each of them set a (configurable) timer. While the timer is running, the SGW/PGW should treat the first received Modify Bearer Request "with forgiveness". When the Modify Bearer Request has been answered, the timer may be stopped. "With forgiveness" refers to that while the timer is running, the PGW/SGW 110, 108 should ignore any bearer mismatch in the first received Modify Bearer Request/Modify Access Bearers Request for the same PDN Connection/UE 101, as described in step 1508 below.

When PGW/SGW 110, 108 has started to handle a Create Bearer Request message, or a Delete Bearer Request message, each of the PGW/SGW 110, 108 should set start a locally configurable time, and set a flag.

After the timer has been stopped SGW/PGW should treat Modify Bearer Request normally.

Step 1506

The MME 105 sends a Create Bearer Response message to the SGW 108, for further transmission to the PGW 110. The Create Bearer Response message may comprise an indication of the bearer with the EBI={6} which is the bearer which should be created.

Step 1507

The MME 105 sends a Modify Bearer Request message to the SGW 108, for further transmission to the PGW 110. The Modify Bearer Request message may comprise an indication of the bearer with the EBI={5} or EBI={5,6} which is the bearer(s) which should be modified. The Modify Bearer Request message is the first Modify Bearer Request message after the Create Session Request message in step 1502. This step is equally applicable to a Modify Access Bearers Request message.

The Create Bearer Response message and the Modify Bearer Request message may not be received by the SGW 108 or the PGW 110 in the same order as they were sent from the MME 105, as indicated with the clouds and the dotted crossed lines in FIG. 15.

Step 1508

While the timer is running the PGW/SGW 110, 108 should ignore any bearer mismatch in the first received Modify Bearer Request message for the same PDN Connection/UE 101. If the PGW/SGW 110, 108 detects a bearer mismatch in the message, the PGW/SGW 110, 108 should accept the request to the message as if there were no bearer mismatch, and in the corresponding Modify Bearer Response message, the S(P)GW 110, 108 may add a new information element with information about the unknown/missing bearers. The information may be in the form of a list of the unknown/missing bearers in the mismatch. Based on the received information, the MME/SGSN 105 can determine if there is a need for the further action, e.g. the S(P)GW has wrongly accepted the unknown bearer(s).

The Modify Bearer Response message is transmitted from the PGW 110 to the SGW 108. The Modify Bearer Response is then received by the SGW 108 from the PGW 110. The Modify Bearer Response message is transmitted from the SGW 108 to the MME 105.

The information element with the information about the unknown/Missing bearers may be of the IE Type "Private Extension", or a regular information element, such as for example of the IE Type "Bearer Context".

This step is equally applicable to a Modify Access Bearers Request message.

Step 1509

After the timer has expired, or after the first Modify Bearer Request for the same PDN Connection/UE has been handled—whichever comes first—the PGW/SGW 110, 108 may resume regular handling of subsequent Modify Bearer Request message. This step is equally applicable to a Modify Access Bearers Request message.

Figure 10:
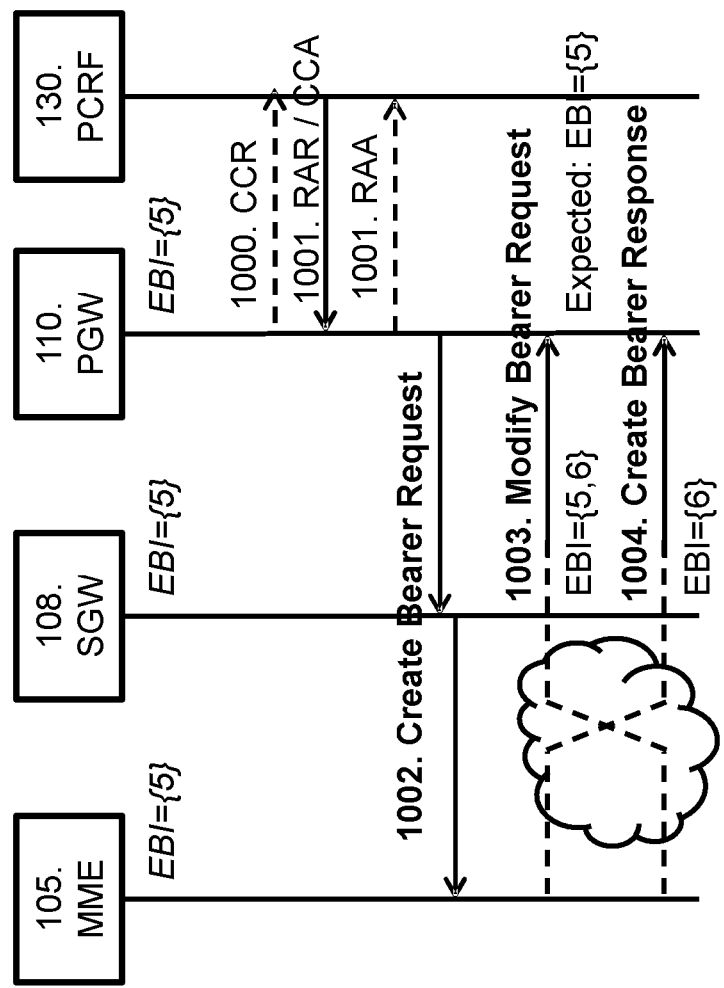
FIG. 10 is a signaling diagram illustrating a procedure for Racing Condition: Create Bearer Response and Modify Bearer Request, case 3.
Figure 11:
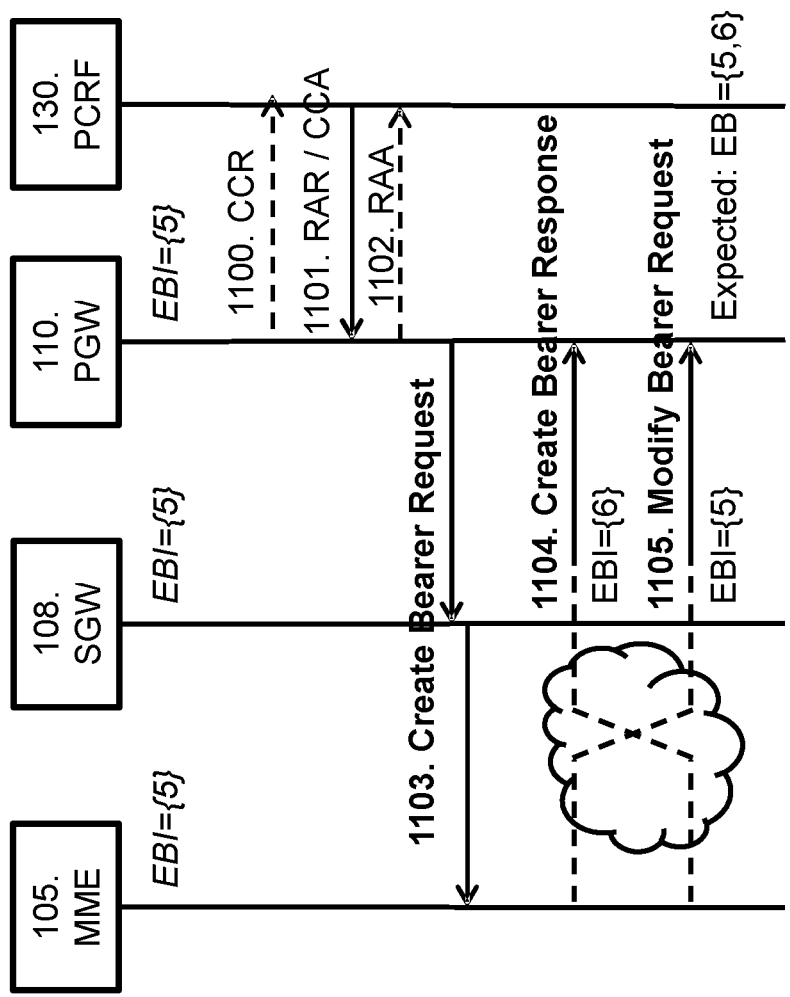
FIG. 11 is a signaling diagram illustrating a procedure for Racing Condition: Create Bearer Response and Modify Bearer Request, case 4.
Figure 12:
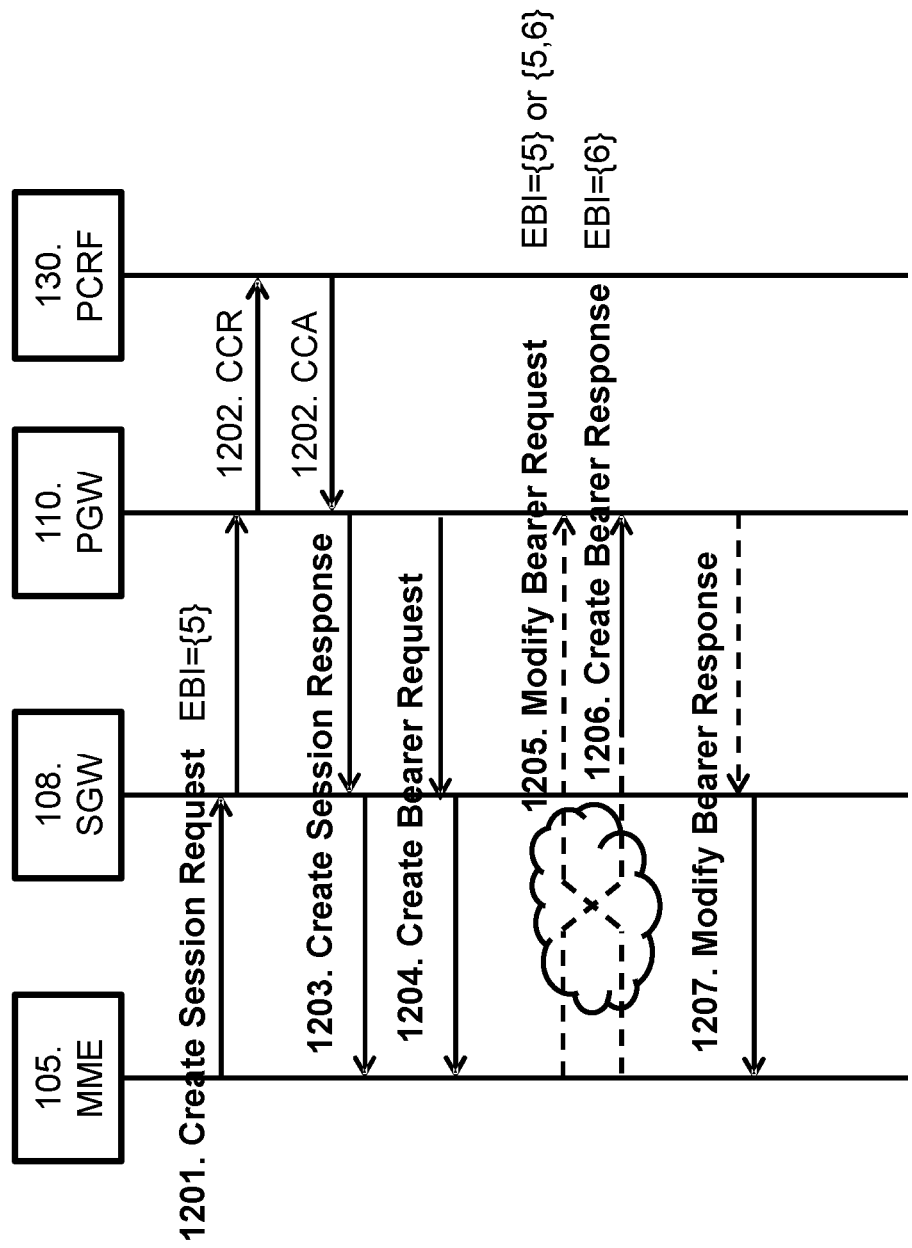
FIG. 12 is a signaling diagram illustrating a procedure for Racing Condition: Create Bearer Response and Modify Bearer Request.
Figure 16:
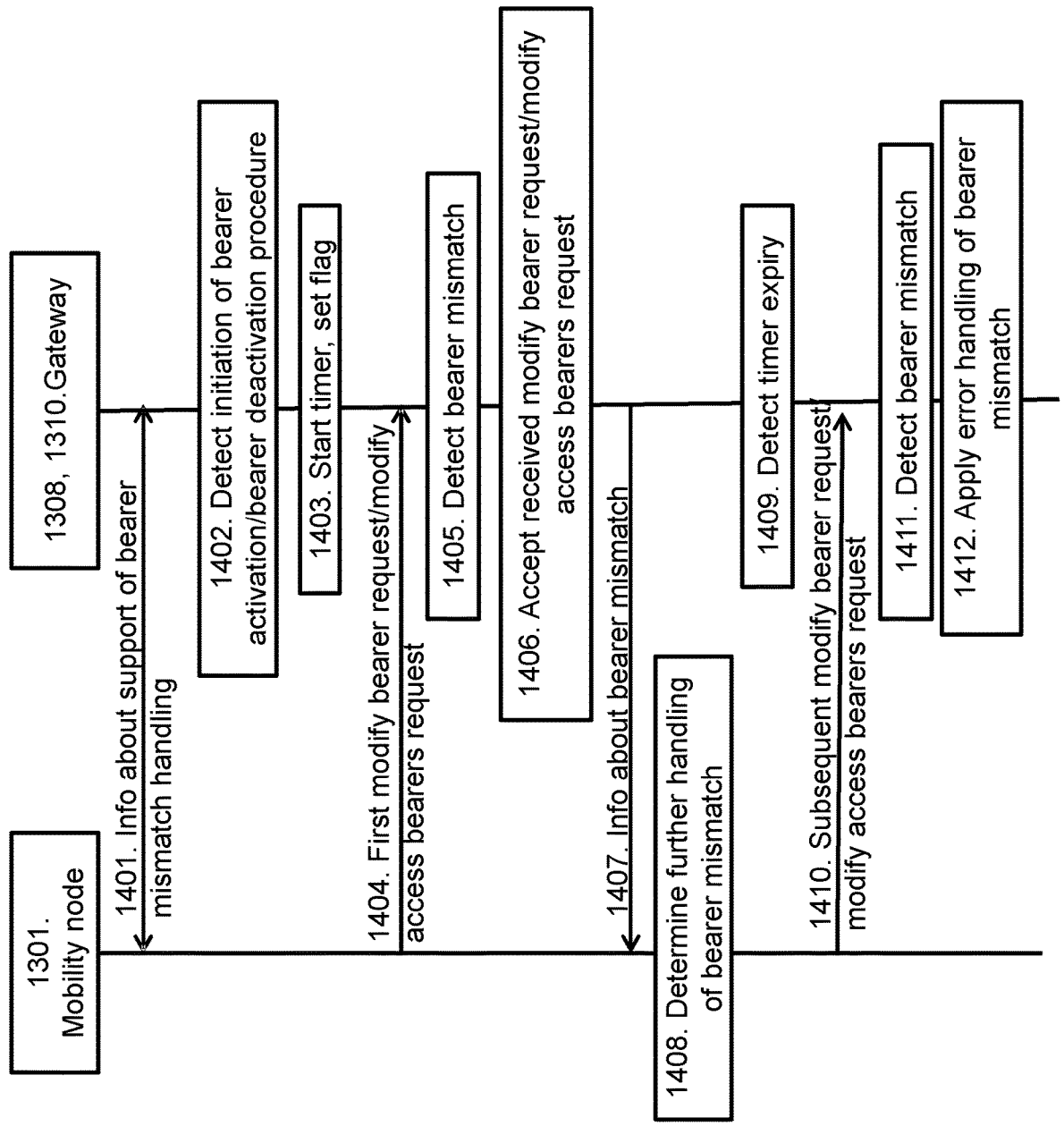
FIG. 16 is a signaling diagram illustrating embodiments of a method.

In the scenarios described in FIGS. 10 and 11 above, the gateway 1308, 1310 (which may correspond to a PGW 110 and SGW 108) should be aware that a dedicated bearer is being created, and neither reject the Modify Bearer Request nor delete the newly created dedicated bearer with the embodiments herein as described in relation to FIGS. 16 and 17.

With the embodiments described herein, the risk in the "Create scenario" that either the newly created bearer(s), or the entire PDN connection, is torn down in case of a bearer mismatch is at least reduced or removed. Furthermore, the risk in the "Delete scenario" that the entire PDN connection is torn down in case of a bearer mismatch is also at least reduced or removed with the embodiments herein.

Figure 18:
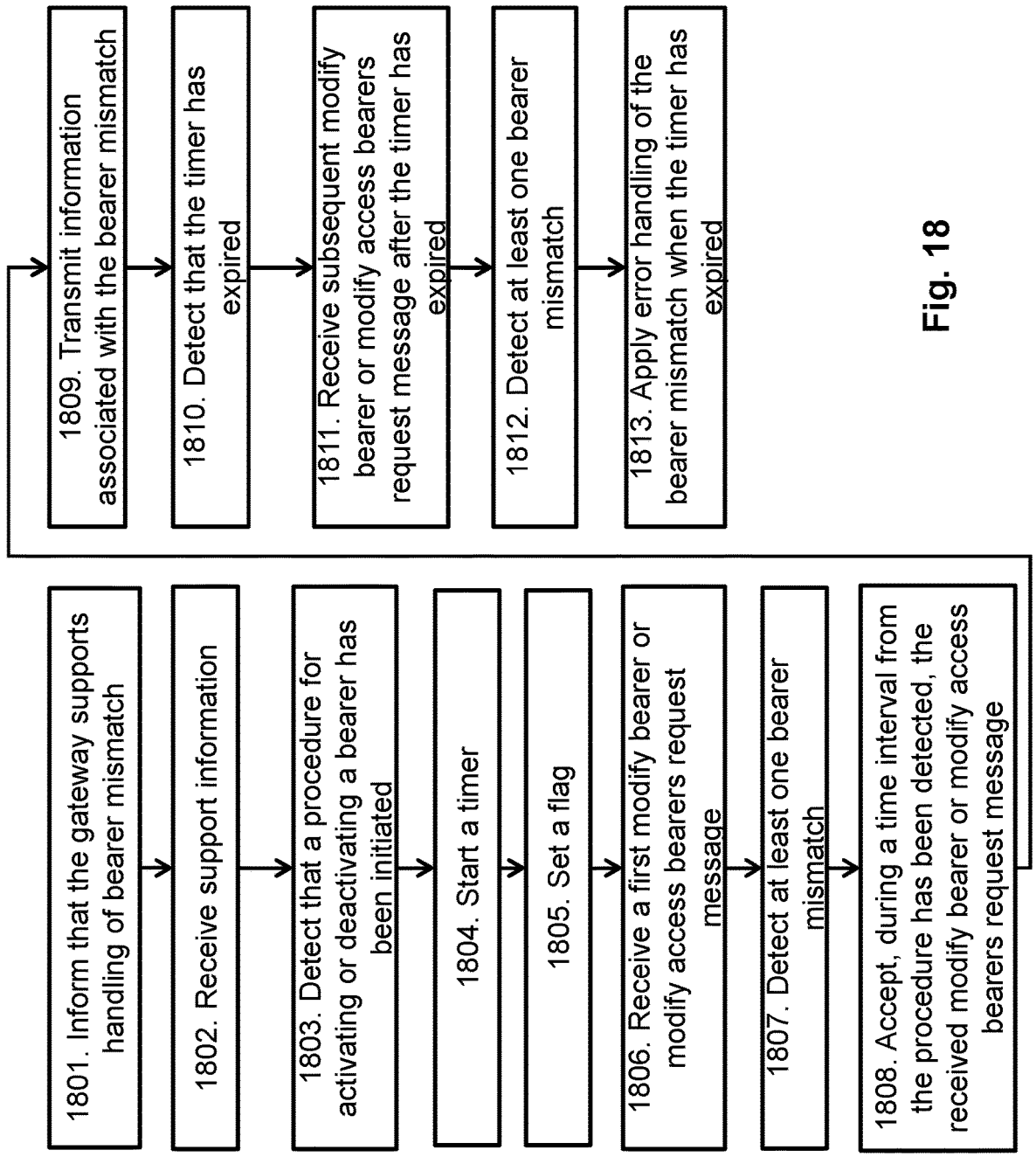
FIG. 18 is a flow chart illustrating embodiments of a method performed by a gateway.

The method described above will now be described seen from the perspective of the gateway. FIG. 18 is a flowchart describing the present method performed by the gateway 108, 110, 1308, 1310 for handling bearers in the communications system 100. The gateway 108, 110, 1308, 1310 may be a first gateway 1308, and the first gateway 1308 may be a SGW 108. The gateway 108, 110, 1308, 1310 may be a second gateway 1310, and the second gateway 1310 is a PGW 110.

The method comprises at least some of the following steps to be performed by the gateway 108, 110, 1308, 1310, which steps may be performed in any suitable order than described below:

Step 1801

This step corresponds to step 1401 in FIG. 16 and step 1501 in FIG. 17. The gateway 108, 110, 1308, 1310 may inform at least one of another gateway 108, 110, 1308, 1310 and a mobility node 105, 1301 that the gateway 108, 110, 1308, 1310 supports handling of bearer mismatch. The bearer may be an EPS bearer. The bearer may be a dedicated bearer.

Step 1802

This step corresponds to step 1401 in FIG. 16 and step 1501 in FIG. 17. The gateway 108, 110, 1308, 1310 may receive support information from at least one of the other gateway 108, 110, 1308, 1310 and the mobility node 105, 1301 that they support the handling of bearer mismatch.

Step 1803

This step corresponds to step 1402 in FIG. 16 and step 1504 in FIG. 17. The gateway 108, 110, 1308, 1310 detects that a procedure for activating or deactivating a bearer has been initiated. The bearer is associated with a PDN connection and a UE 101.

Step 1804

This step corresponds to step 1403 in FIG. 16 and step 1505 in FIG. 17. The gateway 108, 110, 1308, 1310 may start a timer when the procedure has been detected. The time interval may last while the timer is running.

The timer may be a period that the risk of a racing condition in the communication system 100 has increased since the bearer activation or deactivation procedure has been initiated.

Step 1805

This step corresponds to step 1403 in FIG. 16. The gateway 108, 110, 1308, 1310 may set a flag when the procedure has been detected. The flag may indicate that the bearer activation or deactivation procedure is pending. The time interval may last while the flag is set. The flag may be a dedicated bearer activation flag or a dedicated bearer deactivation flag.

Step 1806

This step corresponds to step 1404 in FIG. 16 and step 1507 in FIG. 17. The gateway 108, 110, 1308, 1310 receives a first modify bearer or modify access bearers request message from a mobility node 105, 1305 for the same PDN connection and UE 101 as the bearer activation or deactivation procedure is intended for. The message identifies a first set of bearers associated with said same PDN connection and UE 101.

Step 1807

This step corresponds to step 1405 in FIG. 16. The gateway 108, 110, 1308, 1310 detects at least one bearer mismatch between the first set of bearers and a second set of bearers known by the gateway 108, 110, 1308, 1310 and associated with said same PDN connection and UE 101.

Step 1808

This step corresponds to step 1406 in FIG. 16. The gateway 108, 110, 1308, 1310 accepts, during a time interval from the procedure has been detected, the received modify bearer or modify access bearers request message even though the bearer mismatch has been detected.

The time interval may last until the first modify bearer or the modify access bearers request message is received without any bearer mismatch.

Step 1809

This step corresponds to step 1407 in FIG. 16 and step 1508 in FIG. 17. The gateway 108, 110, 1308, 1310 may transmit information associated with the bearer mismatch to the mobility node 105, 1305.

The information associated with the bearer mismatch may indicate at least one bearer which is missing or unknown in the first received modify bearer or modify access bearers request message.

Step 1810

This step corresponds to step 1409 in FIG. 16. The gateway 108, 110, 1308, 1310 may detect that the timer has expired.

The timer may expire after a predetermined amount of time.

Step 1811

This step corresponds to step 1410 in FIG. 16 and step 1509 in FIG. 17. The gateway 108, 110, 1308, 1310 may receive subsequent modify bearer or modify access bearers request message after the timer has expired. The message identifies a third set of bearers associated with said same PDN connection and UE 101.

Step 1812

This step corresponds to step 1411 in FIG. 16. When the timer has expired, the gateway 108, 110, 1308, 1310 may detect at least one bearer mismatch between the third set of bearers and the second set of bearers known by the gateway 108, 110, 1308, 1310 and associated with said same PDN connection and UE 101.

Step 1813

This step corresponds to step 1412 in FIG. 16. The gateway 108, 110, 1308, 1310 may apply error handling of the bearer mismatch when the timer has expired.

Figure 19:
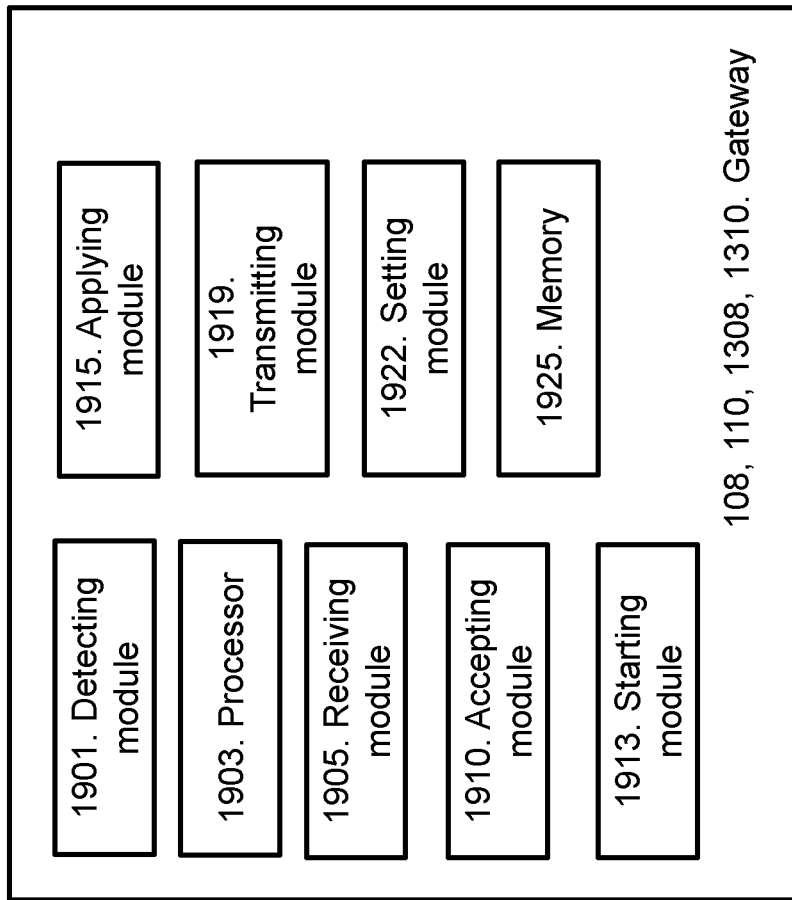
FIG. 19 is a schematic block diagram illustrating embodiments of a gateway.

To perform the method steps shown in FIG. 18 for handling bearers in the communications system 100, the gateway 108, 110, 1308, 1310 may comprise an arrangement as shown in FIG. 19. The gateway 108, 110, 1308, 1310 may be a first gateway 1308, and the first gateway 1308 may be a SGW 108. The gateway 108, 110, 1308, 1310 may be a second gateway 1310, and the second gateway 1310 may be a PGW 110. To perform the method steps shown in FIG. 18 for handling bearers in the communications system 100, the gateway 108, 110, 1308, 1310 is adapted to, e.g. by means of a detecting module 1901, detect that a procedure for activating or deactivating a bearer has been initiated. The bearer is associated with a PDN connection and a UE 101. The bearer may be an EPS bearer. The bearer may be a dedicated bearer. The detecting module 1901 may also be referred to as a detecting unit, a detecting means, a detecting circuit, means for detecting etc. The detecting module 1901 may be a processor 1903 of the gateway 108, 110, 1308, 1310.

The gateway 108, 110, 1308, 1310 is adapted to, e.g. by means of a receiving module 1905, to receive a first modify bearer or modify access bearers request message from a mobility node 105, 1305 for the same PDN connection and UE 101 as the bearer activation or deactivation procedure is intended for. The message identifies a first set of bearers associated with said same PDN connection and UE 101. The receiving module 1905 may also be referred to as a receiving unit, a receiving means, a receiving circuit, means for receiving, input unit etc. The receiving module 1905 may be a receiver, a transceiver etc. The receiving module 1905 may be a wireless receiver of the gateway 108, 110, 1308, 1310 of a wireless or fixed communications system.

The gateway 108, 110, 1308, 1310 is adapted to, e.g. by means of the detecting module 1901, detect at least one bearer mismatch between the first set of bearers and a second set of bearers known by the gateway 108, 110, 1308, 1310 and associated with said same PDN connection and UE 101.

The gateway 108, 110, 1308, 1310 is adapted to, e.g. by means of an accepting module 1910, accept, during a time interval from the procedure has been detected, the received modify bearer or modify access bearers request message even though the bearer mismatch has been detected. The time interval may last until the first modify bearer or the modify access bearers request message is received without any bearer mismatch. The accepting module 1910 may also be referred to as an accepting unit, an accepting means, an accepting circuit, means for accepting etc. The accepting module 1910 may be the processor 1903 of the gateway 108, 110, 1308, 1310.

The gateway 108, 110, 1308, 1310 may be adapted to, e.g. by means of a starting module 1913, start a timer when the procedure has been detected. The time interval lasts while the timer is running. The time interval corresponds to that the gateway 108, 110, 1308, 1310 is adapted to start the timer. The timer may be a period that the risk of a racing condition in the communication system 100 has increased since the bearer activation or deactivation procedure has been initiated. The timer may expire after a predetermined amount of time. The starting module 1913 may also be referred to as a starting unit, a starting means, a starting circuit, means for starting etc. The starting module 1901 may be the processor 1903 of the gateway 108, 110, 1308, 1310.

The gateway 108, 110, 1308, 1310 may be adapted to, e.g. by means of the detecting module 1901, detect that the timer has expired.

The gateway 108, 110, 1308, 1310 may be adapted to, e.g. by means of the receiving module 1905, receive subsequent modify bearer or modify access bearers request message after the timer has expired. The message identifies a third set of bearers associated with said same PDN connection and UE 101.

The gateway 108, 110, 1308, 1310 may be adapted to, e.g. by means of the detecting module 1901, when the timer has expired, detect at least one bearer mismatch between the third set of bearers and the second set of bearers known by the gateway 108, 110, 1308, 1310 and associated with said same PDN connection and UE 101.

The gateway 108, 110, 1308, 1310 may be adapted to, e.g. by means of an applying module 1915, apply error handling of the bearer mismatch when the timer has expired. The applying module 1915 may also be referred to as an applying unit, an applying means, an applying circuit, means for applying etc. The applying module 1915 may be the processor 1903 of the gateway 108, 110, 1308, 1310.

The gateway 108, 110, 1308, 1310 may be adapted to, e.g. by means of a transmitting module 1919, transmit information associated with the bearer mismatch to the mobility node 105, 1305. The information associated with the bearer mismatch may indicate at least one bearer which is missing or unknown in the first received modify bearer or modify access bearers request message. The transmitting module 1919 may also be referred to as a transmitting unit, a transmitting means, a transmitting circuit, means for transmitting, output unit etc. The transmitting module 1919 may be a transmitter, a transceiver etc. The transmitting module 1919 may be a wireless transmitter of the gateway 108, 110, 1308, 1310 of a wireless or fixed communications system.

The gateway 108, 110, 1308, 1310 may be adapted to, e.g. by means of a setting module 1922, set a flag when the procedure has been detected. The flag indicates that the bearer activation or deactivation procedure is pending. The time interval may last while the flag is set. The flag may be a dedicated bearer activation flag or a dedicated bearer deactivation flag. The setting module 1922 may also be referred to as a setting unit, a setting means, a setting circuit, means for setting etc. The setting module 1922 may be the processor 1903 of the gateway 108, 110, 1308, 1310.

The gateway 108, 110, 1308, 1310 may be adapted to, e.g. by means of the transmitting module 1919, inform at least one of another gateway 108, 110, 1308, 1310 and a mobility node 105, 1301 that the gateway 108, 110, 1308, 1310 supports handling of bearer mismatch.

The gateway 108, 110, 1308, 1310 may be adapted to, e.g. by means of the receiving module 1905, receive from at least one of the other gateway 108, 110, 1308, 1310 and the mobility node 105, 1301 that they support the handling of bearer mismatch.

In some embodiments, the gateway 108, 110, 1308, 1310 comprises the processor 1903 and a memory 1925. The memory 1925 comprises instructions executable by the processor 1925. The memory 1925 may comprise one or more memory units. The memory 1925 is arranged to be used to store data, received data streams, timer, flag, information about procedures, mismatch information, time intervals, request and response messages, set of bearers, information indicating PDN connections and UE, information associated with bearer mismatch, support information, information indicating a race condition, power level measurements, threshold values, time periods, configurations, schedulings, and applications to perform the methods herein when being executed in the gateway 108, 110, 1308, 1310.

Those skilled in the art will also appreciate that the detecting module 1901, the receiving module 1905, the accepting module 1910, the starting module 1913, the applying module 1915, the transmitting module 1919 and the setting module 1922 described above may refer to a combination of analog and digital circuits, and/or one or more processors configured with software and/or firmware, e.g. stored in a memory, that when executed by the one or more processors such as the processor 1903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a first computer program may comprise instructions which, when executed on at least one processor, cause the at least one processor to carry out the relevant method steps in FIGS. 16, 17 and 18. A first carrier may comprise the first computer program, and the first carrier is one of an electronic signal, optical signal, radio signal or computer readable storage medium.

Figure 20:
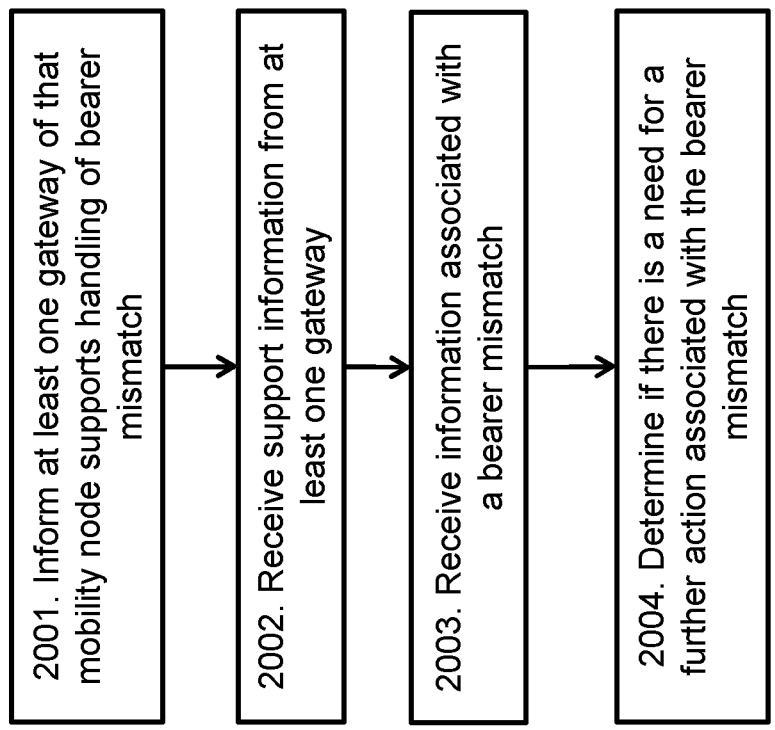
FIG. 20 is a flow chart illustrating embodiments of a method performed by a mobility node.

The method described above will now be described seen from the perspective of the mobility node 105, 1305. FIG. 20 is a flowchart describing the present method performed by the mobility node 105, 1305 for handling bearers in the communications system 100. The bearer may be an EPS bearer. The bearer may be a dedicated bearer. The mobility node may be a MME, a S4-SGSN, an ePDG, or a TWAN. The method comprises at least some of the following steps to be performed by the mobility node 105, 1305, which steps may be performed in any suitable order than described below:

Step 2001

This step corresponds to step 1401 in FIG. 16 and step 1501 in FIG. 17. The mobility node 105, 1305 may inform at least one gateway 108, 110, 1305, 1308 of that mobility node 105, 1301 supports handling of bearer mismatch.

Step 2002

This step corresponds to step 1401 in FIG. 16 and step 1501 in FIG. 17. The mobility node 105, 1305 may receive, from at least one gateway 108, 110, 1305, 1308, support information which indicates that it support the handling of bearer mismatch.

Step 2003

This step corresponds to step 1407 in FIG. 16 and step 1508 in FIG. 17. The mobility node 105, 1305 receives information associated with a bearer mismatch from a gateway 108, 110, 1308, 1310.

The information associated with the bearer mismatch may indicate at least a bearer which is missing or unknown in a first received modify bearer or modify access bearers request message received by the gateway 108, 110, 1305, 1308.

Step 2004

This step corresponds to step 1408 in FIG. 16. Based on the received information, the mobility node 105, 1305 determines if there is a need for a further action associated with the bearer mismatch.

Figure 21:
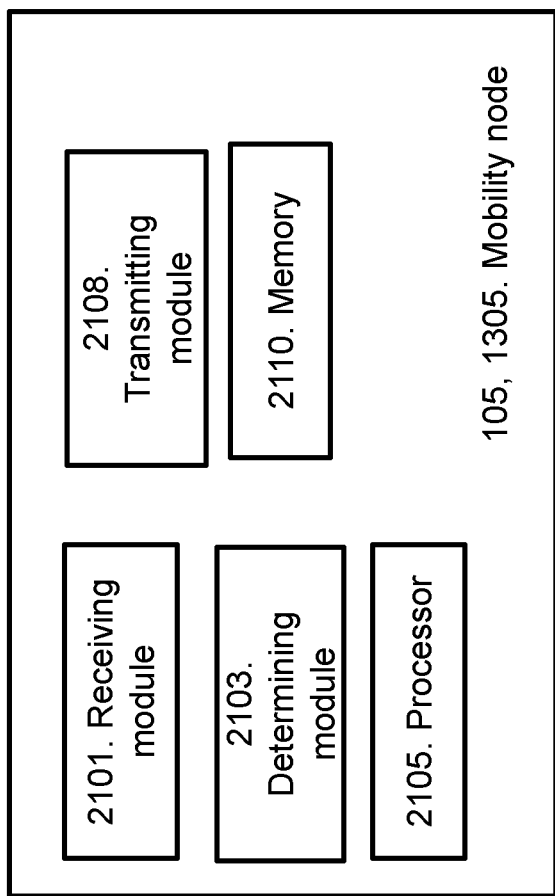
FIG. 21 is a schematic block diagram illustrating embodiments of a mobility node.

To perform the method steps shown in FIG. 20 for handling bearers in the communications system 100 the mobility node 105, 1305 may comprise an arrangement as shown in FIG. 21. The bearer may be an EPS bearer. The bearer may be a dedicated bearer. The mobility node may be a MME, a S4-SGSN, an ePDG, or a TWAN.

To perform the method steps shown in FIG. 20 for handling bearers in the communications system 100, the mobility node 105, 1305 is adapted to, e.g. by means of a receiving module 2101, receive information associated with a bearer mismatch from a gateway 108, 110, 1305, 1308. The information associated with the bearer mismatch may indicate at least a bearer which is missing or unknown in a first received modify bearer or modify access bearers request message received by the gateway 108, 110, 1305, 1308. The receiving module 2101 may also be referred to as a receiving unit, a receiving means, a receiving circuit, means for receiving, input unit etc. The receiving module 2101 may be a receiver, a transceiver etc. The receiving module 2101 may be a wireless receiver of the mobility node 105, 1305 of a wireless or fixed communications system.

The mobility node 105, 1305 is adapted to, e.g. by means of a determining module 2103, based on the received information, determine if there is a need for a further action associated with the bearer mismatch. The determining module 2103 may also be referred to as a determining unit, a determining means, a determining circuit, means for determining etc. The determining module 2103 may be a processor 2105 of the mobility node 105, 1305.

The mobility node 105, 1305 may be further adapted to, e.g. by means of a transmitting module 2108, inform at least one gateway 108, 110, 1305, 1308 of that mobility node 105, 1301 supports handling of bearer mismatch. The transmitting module 2108 may also be referred to as a transmitting unit, a transmitting means, a transmitting circuit, means for transmitting, output unit etc. The transmitting module 2108 may be a transmitter, a transceiver etc. The transmitting module 2108 may be a wireless transmitter of the mobility node 105, 1305 of a wireless or fixed communications system.

The mobility node 105, 1305 may be further adapted to, e.g. by means of the receiving module 2101, receive from at least one gateway 108, 110, 1305, 1308 that it support the handling of bearer mismatch.

In some embodiments, the mobility node 105, 1305 comprises the processor 2105 and a memory 2110. The memory 2110 comprises instructions executable by the processor 2105. The memory 2110 may comprise one or more memory units. The memory 2110 is arranged to be used to store data, received data streams, timer, flag, information about procedures, mismatch information, time intervals, request and response messages, set of bearers, information indicating PDN connections and UE, information associated with bearer mismatch, support information, information indicating a race condition, power level measurements, threshold values, time periods, configurations, schedulings, and applications to perform the methods herein when being executed in the mobility node 105, 1305.

Those skilled in the art will also appreciate that receiving module 2101, the determining module 2103 and the transmitting module 2108, described above may refer to a combination of analog and digital circuits, and/or one or more processors configured with software and/or firmware, e.g. stored in a memory, that when executed by the one or more processors such as the processor 2105 perform as described above. One or more of these processors, as well as the other digital hardware, may be included in a single ASIC, or several processors and various digital hardware may be distributed among several separate components, whether individually packaged or assembled into a SoC.

In some embodiments, a second computer program may comprise instructions which, when executed on at least one processor, cause the at least one processor to carry out the relevant method steps in FIGS. 16, 17 and 20. A second carrier may comprise the second computer program, and the second carrier is one of an electronic signal, optical signal, radio signal or computer readable storage medium.

The present mechanism for handling bearers in the communications system 100 may be implemented through one or more processors, such as a processor 1903 in the gateway arrangement depicted in FIG. 19 and a processor 2105 in the mobility node arrangement depicted in FIG. 21, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the gateway 108, 110, 1308, 1310 and the mobility node 105, 1305. One such carrier may be in the form of a CD ROM disc. It is however feasible with other data carriers such as a memory stick. The computer program code can furthermore be provided as pure program code on a server and downloaded to at least one of the gateway 108, 110, 1308, 1310 and the mobility node 105, 1305.

Summarized, the method consists of at least the following elements to be implemented in a gateway 1308, 1310 such as e.g. a SGW 108 and a PGW 110: a) detect that a Dedicated Bearer Activation procedure, or a Bearer Deactivation procedure, has been initiated, set a flag, preferably called Dedicated Bearer Activation or Deactivation pending flag, and at the same time, starts a new timer (preferably called racing condition period) from this moment where there is an increased risk for racing conditions; b) while there is an increased risk for racing conditions, i.e. when the timer is still running, handle any received Modify Bearer Request and/or Modify Access Bearers Request messages in the way so that bearers that just have been just created are not unintentionally deleted even when those bearers are not present in the Bearer Context to be modified IE; c) detect when the risk for racing conditions is eliminated or at least significantly reduced, i.e. when the timer expires; d) when the risk for racing conditions is eliminated or at least significantly reduced, handle any received Modify Bearer Request and/or Modify Access Bearers Request messages in "the ordinary" manner, so that information consistency between nodes can be maintained (this is what would be done without the embodiments herein, without considering any risk for racing conditions—the trick is to known when there is such a risk and when there is not).

The embodiments herein provide feedback to the originating node with information on which bearers are missing in a message with one or more bearers that are accepted by the receiving node.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a gateway for handling bearers in a communications system, the method comprising:
  detecting that a procedure for activating or deactivating a bearer has been initiated, wherein the bearer is associated with a network connection and a User Equipment (UE);
  receiving a first bearer modification request message, wherein the first bearer modification request message identifies a first set of one or more bearers associated with the network connection and the UE;
  detecting a first bearer mismatch between the first set of bearers and a second set of one or more bearers associated with the network connection and the UE;
  determining whether a condition is satisfied, wherein determining whether the condition is satisfied comprises determining whether the first bearer mismatch was detected during a particular time interval; and
  as a result of determining that the condition is satisfied, accepting the received bearer modification request message even though the first bearer mismatch has been detected.

2. The method of claim 1, further comprising starting a timer after detecting that the procedure has been initiated, wherein the particular time interval begins when the timer is started and ends when the timer expires.

3. The method of claim 2, further comprising:
  detecting that the timer has expired;
  after the timer has expired, receiving a second bearer modification request message after the timer has expired, wherein the second bearer modification request message identifies a third set of bearers associated with the network connection and the UE;
  after receiving the second bearer modification message, detecting a second bearer mismatch between the third set of bearers and the second set of bearers associated with the network connection and the UE; and
  applying error handling of the detected bearer mismatch as a result of detecting the second bearer mismatch and detecting that the timer had expired before the bearer mismatch was detected.

4. The method of claim 2, wherein the time interval is a period of time during which a risk of a racing condition in the communication system has increased since the bearer activation or deactivation procedure has been initiated.

5. The method of claim 2, wherein the timer expires after a predetermined amount of time.

6. The method of claim 1, wherein the time interval lasts until the first request message is received without any bearer mismatch.

7. The method of claim 1, wherein a mobility node transmitted the first bearer modification request message, and the method further comprises transmitting information associated with the first bearer mismatch to the mobility node.

8. The method of claim 7, wherein the information associated with the first bearer mismatch indicates at least one bearer which is missing or unknown in the first bearer modification request message.

9. The method of claim 1, further comprising:
setting a flag after detecting that the procedure has been initiated, wherein the flag indicates that the bearer activation or deactivation procedure is pending; and
where the time interval lasts while the flag is set.

10. The method of claim 9, wherein the flag is a dedicated bearer activation flag or a dedicated bearer deactivation flag.

11. The method of claim 1, further comprising:
informing at least one of another gateway or a mobility node that the gateway supports handling of bearer mismatch; and
receiving from at least one of the other gateway or the mobility node, support information indicating that they support the handling of bearer mismatch.

12. The method of claim 1, wherein
the network connection is a Packet Data Network (PDN) connection, and
the bearer is an Evolved Packet System (EPS) bearer and/or a dedicated bearer.

13. A gateway for handling bearers in a communications system, the gateway comprising:
a memory; and
processing circuitry coupled to the memory, wherein the gateway is adapted to:
detect that a procedure for activating or deactivating a bearer has been initiated, wherein the bearer is associated with a network connection and a User Equipment (UE);
receive a first bearer modification request message, wherein the first bearer modification request message identifies a first set of bearers associated with the network connection and the UE;
detect a first bearer mismatch between the first set of bearers and a second set of bearers associated with the network connection and the UE;
determine whether a condition is satisfied, wherein the gateway is configured to determine whether the condition is satisfied by performing a process that comprises determining whether the first bearer mismatch was detected during a particular time interval; and
as a result of determining that the condition is satisfied, accept the received bearer modification request message even though the first bearer mismatch has been detected.

14. The gateway of claim 13, wherein the gateway is further adapted to start a timer after detecting that the procedure has been initiated, wherein the particular time interval begins when the timer is started and ends when the timer expires.

15. The gateway of claim 14, being further adapted to:
detect that the timer has expired;
after the timer has expired, receive a second bearer modification request message after the timer has expired, wherein the second bearer modification request message identifies a third set of bearers associated with the network connection and the UE;
after receiving the second bearer modification message, detect a second bearer mismatch between the third set of bearers and the second set of bearers associated with the network connection and the UE; and
apply error handling of the detected bearer mismatch as a result of detecting the second bearer mismatch and detecting that the timer had expired before the bearer mismatch was detected.

16. The gateway of claim 14, wherein the timer is a period that the risk of a racing condition in the communication system has increased since the bearer activation or deactivation procedure has been initiated.

17. The gateway of claim 14, wherein the timer expires after a predetermined amount of time.

18. The gateway of claim 13, wherein the time interval lasts until the first bearer modification request message is received without any bearer mismatch.

19. The gateway of claim 13, wherein a mobility node transmitted the first bearer modification request message, and the method and the gateway being further adapted to transmit information associated with the bearer mismatch to the mobility node.

20. The gateway of claim 19, wherein the information associated with the bearer mismatch indicates at least one bearer which is missing or unknown in the first received modify bearer or modify access bearers request message.

21. The gateway of claim 13, being further adapted to set a flag after detecting that the procedure has been initiated, wherein the flag indicates that the bearer activation or deactivation procedure is pending, wherein the time interval lasts while the flag is set.

22. The gateway of claim 21, wherein the flag is a dedicated bearer activation flag or a dedicated bearer deactivation flag.

23. The gateway of claim 13, being further adapted to:
inform at least one of another gateway or a mobility node that the gateway supports handling of bearer mismatch; and
receive from at least one of the other gateway or the mobility node that they support the handling of bearer mismatch.

24. The gateway of claim 13, wherein
the bearer is an Evolved Packet System (EPS) bearer, and/or
the bearer is a dedicated bearer.

25. The gateway of claim 13, wherein
the network connection is a Packet Data Network (PDN) connection, and
the gateway is a Serving Gateway or a PDN Gateway.

* * * * *

UNITED STATES PATENT AND TRADEMARK OFFICE
CERTIFICATE OF CORRECTION

| | |
|---|---|
| PATENT NO. | : 11,696,358 B2 |
| APPLICATION NO. | : 17/377747 |
| DATED | : July 4, 2023 |
| INVENTOR(S) | : Olsson et al. |

It is certified that error appears in the above-identified patent and that said Letters Patent is hereby corrected as shown below:

In the Specification

In Column 1, Line 7, delete "2020," and insert -- 2020, now Pat. No. 11,071,161, --, therefor.

In Column 5, Line 25, delete "MMME" and insert -- MME --, therefor.

In Column 6, Line 54, delete "T3-REPONSE" and insert -- T3-RESPONSE --, therefor.

In Column 10, Line 23, delete "RRA message" and insert -- RAA message --, therefor.

In Column 11, Line 27, delete "RRA message" and insert -- RAA message --, therefor.

In Column 13, Line 4, delete "RRA message" and insert -- RAA message --, therefor.

In Column 14, Line 65, delete "RRA message" and insert -- RAA message --, therefor.

In Column 14, Line 66, delete "RRA message" and insert -- RAA message --, therefor.

In Column 16, Line 19, delete "RAA message" and insert -- RAR message --, therefor.

In Column 16, Line 20, delete "RRA message" and insert -- RAA message --, therefor.

In Column 17, Line 49, delete "RRA message" and insert -- RAA message --, therefor.

In Column 22, Line 6, delete "EBI={5}" and insert -- EBI={6} --, therefor.

In the Claims

In Column 39, Line 23, Claim 9, delete "where" and insert -- wherein --, therefor.

Signed and Sealed this
Seventh Day of November, 2023

Katherine Kelly Vidal
*Director of the United States Patent and Trademark Office*